United States Patent [19]
Allen et al.

[11] Patent Number: 5,768,256
[45] Date of Patent: Jun. 16, 1998

[54] COMMUNICATIONS SYSTEM AND METHOD PROVIDING OPTIMAL RESTORATION OF FAILED-PATHS

[75] Inventors: John David Allen, Garland; Lee D. Bengston, Murphy, both of Tex.

[73] Assignee: MCI Corporation, Washington, D.C.

[21] Appl. No.: 580,718

[22] Filed: Dec. 29, 1995

[51] Int. Cl.$^6$ .................................................... H04J 3/12
[52] U.S. Cl. .................................. 370/218; 370/384
[58] Field of Search ............................ 340/827, 825.01, 340/825.03, 285.06, 825.16; 395/180, 181, 182.02; 370/216, 217, 218, 219, 220, 221, 225, 226, 227, 228

[56] References Cited

U.S. PATENT DOCUMENTS

| | | | |
|---|---|---|---|
| 4,393,493 | 7/1983 | Edwards | 370/228 |
| 4,956,835 | 9/1990 | Grover | 370/228 |
| 5,068,892 | 11/1991 | Livanos | 379/221 |
| 5,168,495 | 12/1992 | Smith | 370/459 |
| 5,173,689 | 12/1992 | Kusano | 340/827 |
| 5,235,599 | 8/1993 | Nishimura et al. | 395/182.02 |
| 5,311,586 | 5/1994 | Bogart et al. | 379/221 |
| 5,459,716 | 10/1995 | Fahim et al. | 370/16 |
| 5,461,608 | 10/1995 | Yoshiyama | 370/16.1 |
| 5,469,439 | 11/1995 | Thaler et al. | 370/94.3 |
| 5,479,608 | 12/1995 | Richardson | 395/182.02 |
| 5,495,471 | 2/1996 | Chow et al. | 370/16 |
| 5,513,345 | 4/1996 | Sato et al. | 395/182.02 |
| 5,519,709 | 5/1996 | Albrecht et al. | 370/94.3 |
| 5,537,532 | 7/1996 | Chng et al. | 395/182.02 |
| 5,548,639 | 8/1996 | Ogura et al. | 379/221 |
| 5,550,805 | 8/1996 | Takatori et al. | 370/16.1 |
| 5,581,791 | 12/1996 | Ludwig et al. | 395/860 |

OTHER PUBLICATIONS

Iseda et al., "Modeling of Self–healing Managed Object for TMN," *IEEE International Conference on Communications*, vol. 3, May 23–26 1993, Geneva, Switzerland, pp. 1646–1650.

Yang et al., "Fitness: Failure Immunization Technology for Network Service Survivability," *IEEE Global Telecommunications Conference and Exhibition*, vol. 3, No. 28 1988–Dec. 1, 1988, Hollywood, Florida, USA, pp. 1549–1554.

*Primary Examiner*—Alpus H. Hsu
*Assistant Examiner*—Kwang Bin Yao

[57] ABSTRACT

A system and method for restoring communications between a pair of nodes, between which communications have been broken, in a network. The method comprises the steps of designating one of the nodes a SENDER node and the other a CHOOSER node, where the SENDER and CHOOSER nodes each have a working port connected to a link bearing the interrupted communications; creating a forward restoration signature having a unique priority; selectively transmitting the forward restoration signal from the SENDER node based on its priority; upon receipt of a forward restoration signature at a TANDEM node, modifying and selectively transmitting the forward restoration signature based on its priority; upon receipt of a forward restoration signature at a spare port on the CHOOSER node, choosing the restoration path indicated by the received forward restoration signature, connecting the working port to the spare port, and transmitting a reverse restoration signature having the same priority as the forward restoration signature; upon receipt of a reverse restoration signature at a TANDEM node, based on the priority of the reverse restoration signature, modifying and selectively transmitting the reverse restoration signature, and connecting the port on which the reverse restoration signal was received to the port on which the corresponding forward restoration signature was originally received; and on receipt of a reverse restoration signature at a spare port on the SENDER node, connecting the spare port to the working port, thereby restoring communications between the pair of nodes.

18 Claims, 15 Drawing Sheets

| CHOOSER ID | | | | | | | | |
|---|---|---|---|---|---|---|---|---|
| 201 | na | | | | | | | |
| 202 | 21 | na | | | | | | |
| 203 | 8 | 18 | na | | | | | |
| 204 | 10 | 1 | 17 | na | | | | |
| 205 | 3 | 7 | 11 | 15 | na | | | |
| 206 | 16 | 4 | 2 | 13 | 5 | na | | |
| 207 | 9 | 19 | 6 | 20 | 12 | 14 | na | |
| | 201 | 202 | 203 | 204 | 205 | 206 | 207 | |
| | | | | SENDER ID | | | | |

FIG. 9

COMMUNICATIONS SYSTEM AND METHOD PROVIDING OPTIMAL RESTORATION OF FAILED-PATHS

BACKGROUND OF THE INVENTION

1. Field of the Invention

The field of the present invention relates generally to network restoration, and more particularly to distributed network restoration using prioritized restoration signals.

2. Related Art

A communications network serves to transport information among a number of locations. The information to be transported is usually presented to the network in the form of time-domain electrical signals and may represent any combination of telephony, video, or computer data in a variety of formats. To transport such information, a typical communications network consists of various physical sites, or "nodes," and information conduits, called "links," that interconnect the nodes. Each link serves to carry information from one node to another node. Each node may contain equipment for combining, separating, transforming, conditioning, and routing the information signals.

One or more links that connect two nodes are collectively referred to as a "span." Nodes are often connected by a multiplicity of parallel links due to the need for capacity. In addition, redundant spare links are commonly added between nodes with the intent that they usually carry no data traffic but may be used as alternate routes in the event of partial network failure. This spare link capacity, coupled with the switching ability within the network nodes, allows the network to use rerouting to recover from partial failures by circumventing the failed network elements.

Many techniques have been devised for assuring that, when one network path fails, other, usually spare, paths are used to circumvent the failure and restore normal traffic flow as quickly as possible. Among the automatic restoration techniques, there are two common approaches—centralized and distributed.

The centralized approaches rely upon a central database that is accessed by all the switching nodes. In the variations on this approach, this central database contains information regarding either the overall network topology, or preplanned actions in response to specific failures, or both. These approaches suffer due to a) the need to constantly update the database as the network is enlarged or reconfigured and b) the delay through, and potential failure of, communications links that join the switching nodes to a central database or a network control center.

The distributed approaches are characterized by the use of self-contained operating logic within the switching nodes that form the network. Generally, a distributed restoration approach does not use a centralized database but instead relies upon node logic acting upon local information via connections to adjacent nodes. The intent of these approaches is to use the network itself as the data processing matrix upon which to compute the optimal restoration routes. A well known distributed restoration technique is taught by Wayne D. Grover in U.S. Pat. No. 4,956,835 (hereinafter referred to as "the Grover patent") which is incorporated herein by reference. This technique is commonly referred to as "Selfhealing Networks"™ or "SHN." SHN is a protocol consisting of restoration-specific data structures that are communicated through the network, operating logic within each network node, and a defined sequence of network events to accomplish restoration.

However, the SHN protocol disclosed in the Grover patent suffers from a problem known as "glare." Glare occurs when two separate restoration processes attempt, from opposite directions, to reserve a single bidirectional spare link. When glare occurs between two SHN restoration processes, one or both may terminate.

What is needed, therefore, is a distributed network restoration protocol that is capable of eliminating glare.

SUMMARY OF THE INVENTION

The present invention is a system and method for distributed network restoration. The present invention allows multiple overlapping restoration processes to execute with minimal interference in a common network. To improve both the speed and completeness of restoration, the present invention accomplishes a compromise between serial execution and parallel execution of multiple restoration processes. A purely serial or sequential approach requires coordination among the respective processes. Such an approach can take so long to execute that traffic along many of the failed links will be disconnected for exceeding a recovery time threshold. On the other hand, in a purely parallel approach, all restoration attempts proceed without regard for one another. Such an approach can lead to incomplete restoration, contention for spare resources, and intermittent restoration paths. The present invention provides for self-coordination among multiple restoration processes to achieve an optimal balance. Serialization takes place only where necessary.

The present invention introduces several key concepts. First, each failed span, and thus the failed span's restoration signature, is assigned a priority based on its Sender and Chooser node ID's. Second, one restoration signature can preempt another having a lower priority. Third, the present invention provides for saving preempted signatures in a queue. This permits retransmission of the lower priority signature.

One advantage of the present invention is that it permits multiple restoration processes can proceed concurrently while moderating contention for resources.

Another advantage of the present invention is the elimination of "glare" by prioritizing restoration signals.

BRIEF DESCRIPTION OF THE FIGURES

The present invention will be described with reference to the accompanying drawings, in which:

FIG. 8A is a flowchart summarizing the sequence of restorative actions that take place according to conventional mechanisms.

FIG. 8B is a flowchart summarizing the sequence of actions and nodal logical activity in accordance with the present invention.

FIG. 9 typifies a look-up table for mapping pairs of node ID's into an arbitrary relative priority number in accordance with one embodiment of the present invention.

The preferred embodiment of the invention is described below with reference to these figures where like reference numbers indicate identical or functionally similar elements. Also in the figures, the left most digit of each reference number corresponds to the figure in which the reference number is first used.

DETAILED DESCRIPTION OF THE PREFERRED EMBODIMENT

A communications network serves to transport information among a number of locations. The information to be transported is usually presented to the network in the form of time-domain electrical signals and may represent any combination of telephony, video, or computer data in a variety of formats. To transport such information, a typical communications network consists of various physical sites, or "nodes," and information conduits, called "links," that interconnect the nodes. Each link serves to carry information from one node to another node. Each node may contain equipment for combining, separating, transforming, conditioning, and routing the information signals.

Figure 1:
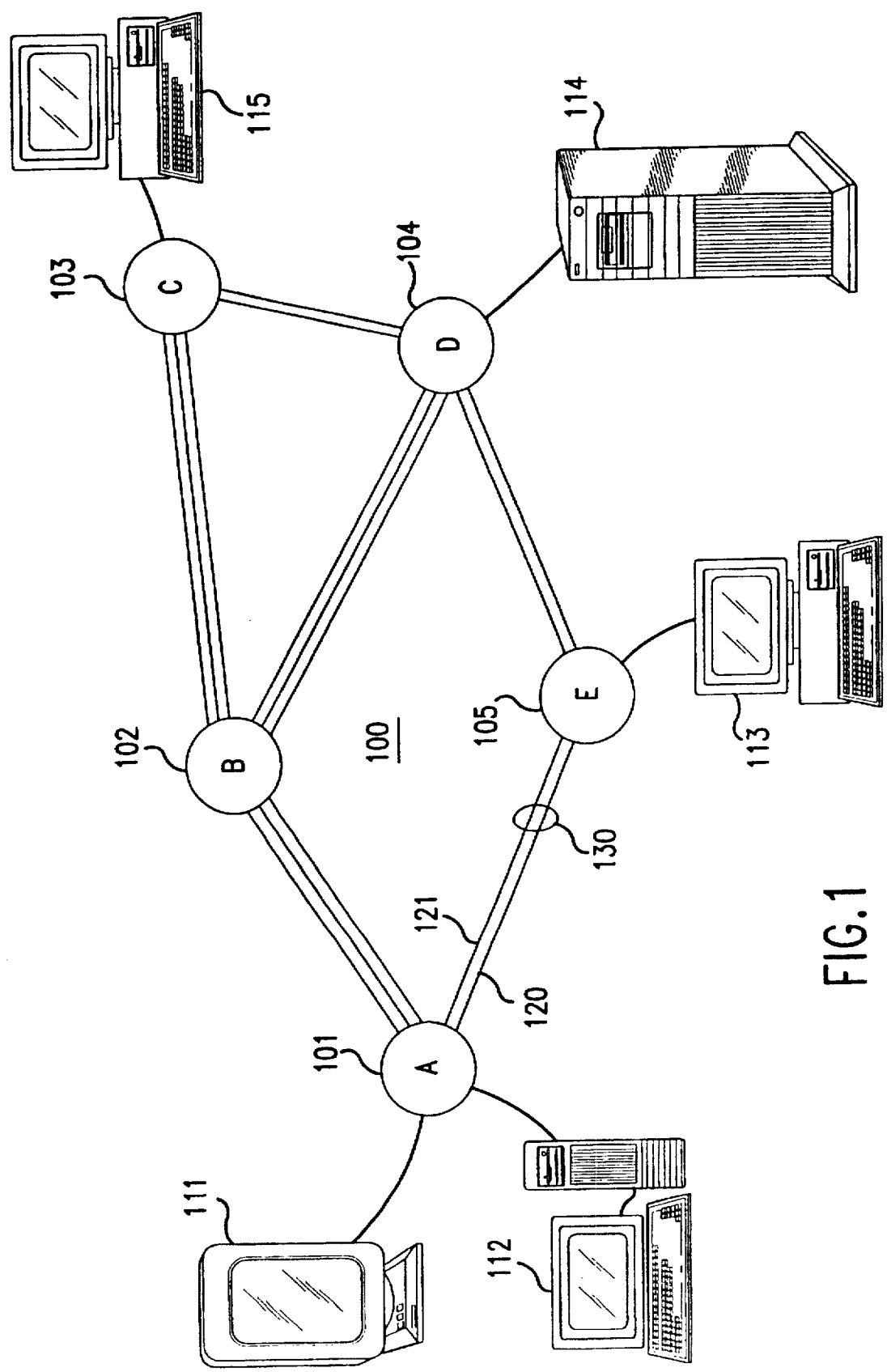
FIG. 1 is an illustration of a typical communications network.

FIG. 1 shows a typical communications network 100 consisting of nodes 101–105 connected by links 120–121. The communications system 100 routes data so as to effectively interconnect data equipment 111–115 that are located at a distance from one another. This routing is accomplished within the network by the ability of each node 101 to perform a one-of-many switching function, that is, to accept data entering along one link and send the data out along a different link. Under normal circumstances, the switching within each node is directed by some overall network routing logic commonly understood by those skilled in the art.

An example of a typical commercially available switch that can serve as a node 101 is the Model 1633-SX Digital CrossConnect Switch manufactured by Alcatel Network Systems. Some other equivalent or analogous switching apparatus may be used in a network to which the present invention is applied without altering the spirit and scope of the present inventive concept.

One or more links that connect two nodes are collectively referred to as a "span." For example, nodes 101 and 105 in FIG. 1 are shown to be connected by span 130 comprising links 120 and 121. Nodes are often connected by a multiplicity of parallel links due to the need for capacity. In addition, redundant spare links are commonly added between nodes with the intent that they usually carry no data traffic but may be used as alternate routes in the event of partial network failure. This spare link capacity, coupled with the switching ability within the network nodes, allows the network to use rerouting to recover from partial failures by circumventing the failed network elements. The specific logic and protocol applied in making switching decisions to accomplish this rerouting is the realm of the present invention.

Due to economies of scale, most telecommunications takes place over large shared network facilities owned and operated by communications service providers. Customers who need communications services are attached to the network, subscribe to the service, and are assessed a charge for using the network.

The information traffic of even a single network data path represents a formidable volume of vital information flow—equivalent to tens of thousands of simultaneous phone calls. Sudden failure of such an information channel can cause a significant loss in revenues for a network owner and loss of commerce and other benefits for the network subscribers. Consequently, techniques have been devised for assuring that, when one network path fails, other, usually spare, paths are used to circumvent the failure and restore normal traffic flow as quickly as possible. Among the automatic restoration techniques, there are two common approaches—centralized and distributed.

The centralized approaches rely upon a central database that is accessed by all the switching nodes. In the variations on this approach, this central database contains information regarding either the overall network topology, or preplanned actions in response to specific failures, or both. These approaches suffer due to a) the need to constantly update the database as the network is enlarged or reconfigured and b) the delay through, and potential failure of, communications links that join the switching nodes to a central database or a network control center.

The distributed approaches are characterized by the use of self-contained operating logic within the switching nodes that form the network. Generally, a distributed restoration approach does not use a centralized database but instead relies upon node logic acting upon local information via connections to adjacent nodes. The intent of these approaches is to use the network itself as the data processing matrix upon which to compute the optimal restoration routes. A well known distributed restoration technique is taught by Wayne D. Grover in U.S. Pat. No. 4,956,835 (herein referred to as "the Grover patent") which is incorporated herein by reference. This technique is commonly referred to as "Selfhealing Networks"™ or "SHN." SHN is a protocol consisting of restoration-specific data structures that are communicated through the network, operating logic within each network node, and a defined sequence of network events to accomplish restoration.

The SHN technique assumes the network can detect failure of a particular link by various means that are well known to those skilled in the art. It is further assumed that both of the two nodes adjacent to the failed linked are aware of the identity and condition of the particular failed link. In the SHN terminology, the two nodes on either end of a link that fails are referred to as the custodial nodes of that link.

Intrinsic to the structure and routing functions of such communications networks is that a selection of any single logical or physical link connected to a given node uniquely identifies an adjacent node in the network. Thus, one custodial node aware of a specific failed link inherently knows the identity of the corresponding adjacent custodial node.

Upon link failure, each of the failed link's two custodial nodes adopts a different one of two roles in the SHN restoration protocol. One node becomes the initiator of special network signals described below; it becomes what is called the Sender. The other node takes on the role of Chooser. Which node fulfills which role is decided at the time of failure based upon some simple criterion such as comparison of assigned unique node ID numbers (e.g., the node having the higher ID number is always the Sender). The search for viable alternate paths then proceeds as discussed below.

The Sender emits a data signal along spare links in all spans to which it is connected. This special data signal, called a restoration sign signature, contains information that indicates that it is restoration-related and contains data fields that identify the Sender and Chooser. Other nodes that receive this type of signal further propagate the signal along other spare links to which they are connected. Thus, the original signatures from the Sender are broadcast throughout the network by a technique known as flooding.

Eventually, one or more of these signatures reaches the corresponding Chooser node, which became receptive to such signals at the instant of link failure. Each intermediate node that passes signatures between the Sender and Chooser nodes is said to adopt the role of a Tandem node in the terminology of the SHN protocol.

The Chooser node collects and reviews the incoming signatures that may arrive via several different routes and applies some logical scheme to select a suitable path over which to reconnect traffic between itself and the Sender. Upon selecting a suitable restoration path, the Chooser returns a reverse-linking signature back along the selected path. The intervening Tandem nodes recognize the return signature and perform both switching and propagation of the return signature in such a way as to secure the path that ultimately joins Sender to Chooser to complete the restoration.

This technique is applied independently for every separate link that fails. Such failed links are often restored over completely separate routes through the network depending on availability of spare links. If failures occur along more than one logical span, then separate instances of the SHN protocol are initiated to restore failed links in each span.

The logic applied within the Sender, Chooser, and Tandems, as well as the data contained within the signatures and the temporal sequencing of network events, constitute the basic SHN protocol. The present invention is a substantial change to the basic SHN protocol with the overall goal of improving both the speed and completeness of automatic restoration in the event of multiple span failures within the network.

Figure 2A:
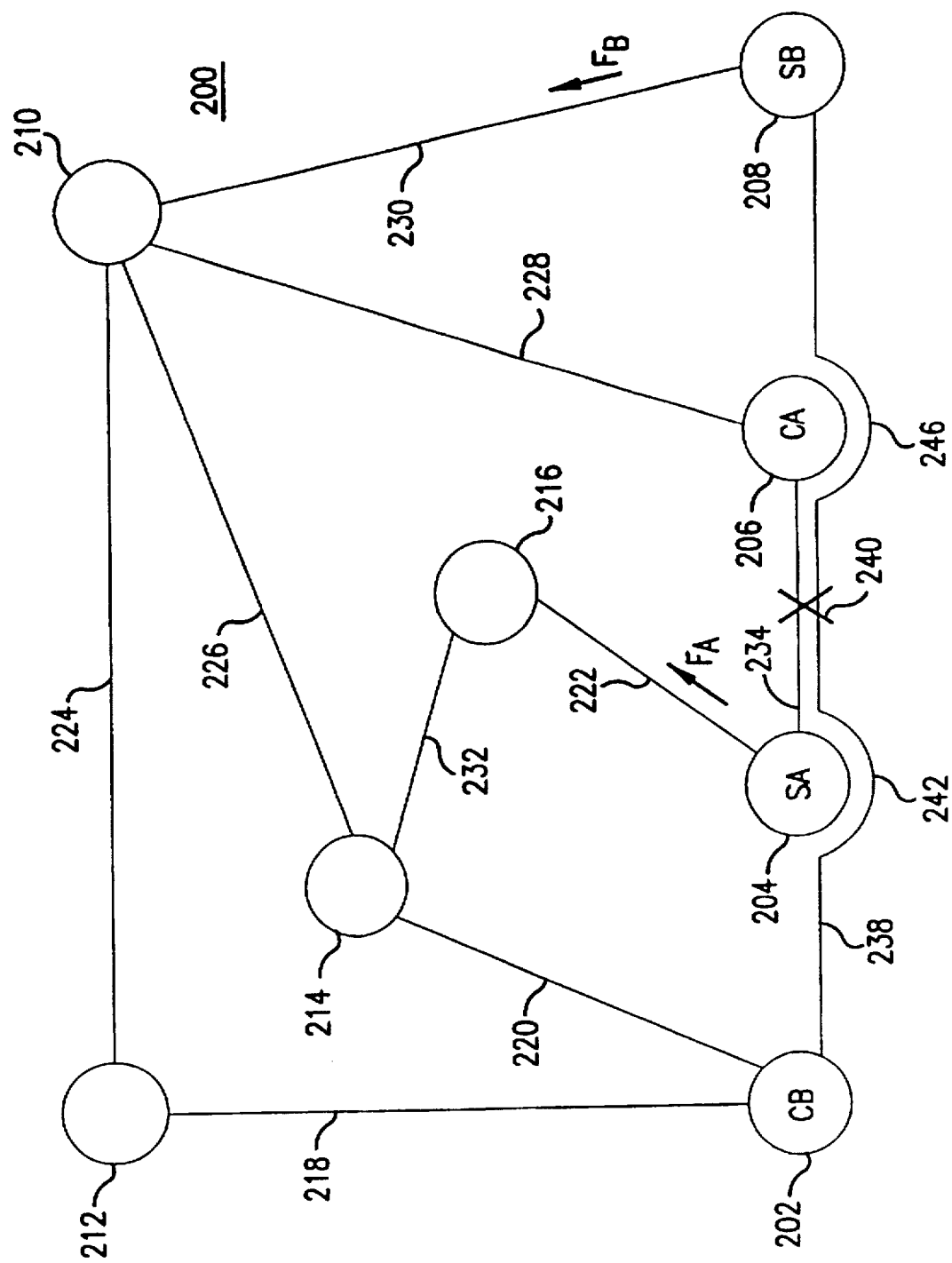
FIGS. 2A–2E illustrate the operation of a conventional network restoration mechanism.

To contrast the behavior of the present invention to that of conventional mechanisms, FIGS. 2A–2E illustrate the operation of a conventional network restoration mechanism. In FIG. 2A, a particular communications network 200, or relevant portion thereof, is depicted as consisting of nodes 202–216, normally traffic-bearing links 234 and 238, and spare links 218–232. Link 238 logically connects node 202 to node 208 but physically passes through nodes 204 and 206 as depicted by passthroughs 242 and 246. For practical reasons, links 234 and 238 may share the same physical conduit joining node 204 and node 206. A single failure 240 may therefore affect both links 234 and 238 even though they are logically distinct.

In response to failure 240, nodes 204 and 206 have been designated as Sender A and Chooser A, respectively, for the restoration of link 234, and nodes 208 and 202 have been designated as Sender B and Chooser B, respectively, for the restoration of link 238, in accordance with conventional mechanisms. Also in FIG. 2A, Sender A 204 and Sender B 208 have dispatched forward restoration signals $F_A$ and $F_B$ along links 222 and 230, respectively. For purposes of illustration, it is assumed that failure 240 affects links 234 and 238 simultaneously, and that propagation delays at all nodes and transmission delays over all links are approximately equal, respectively.

Figure 2B:
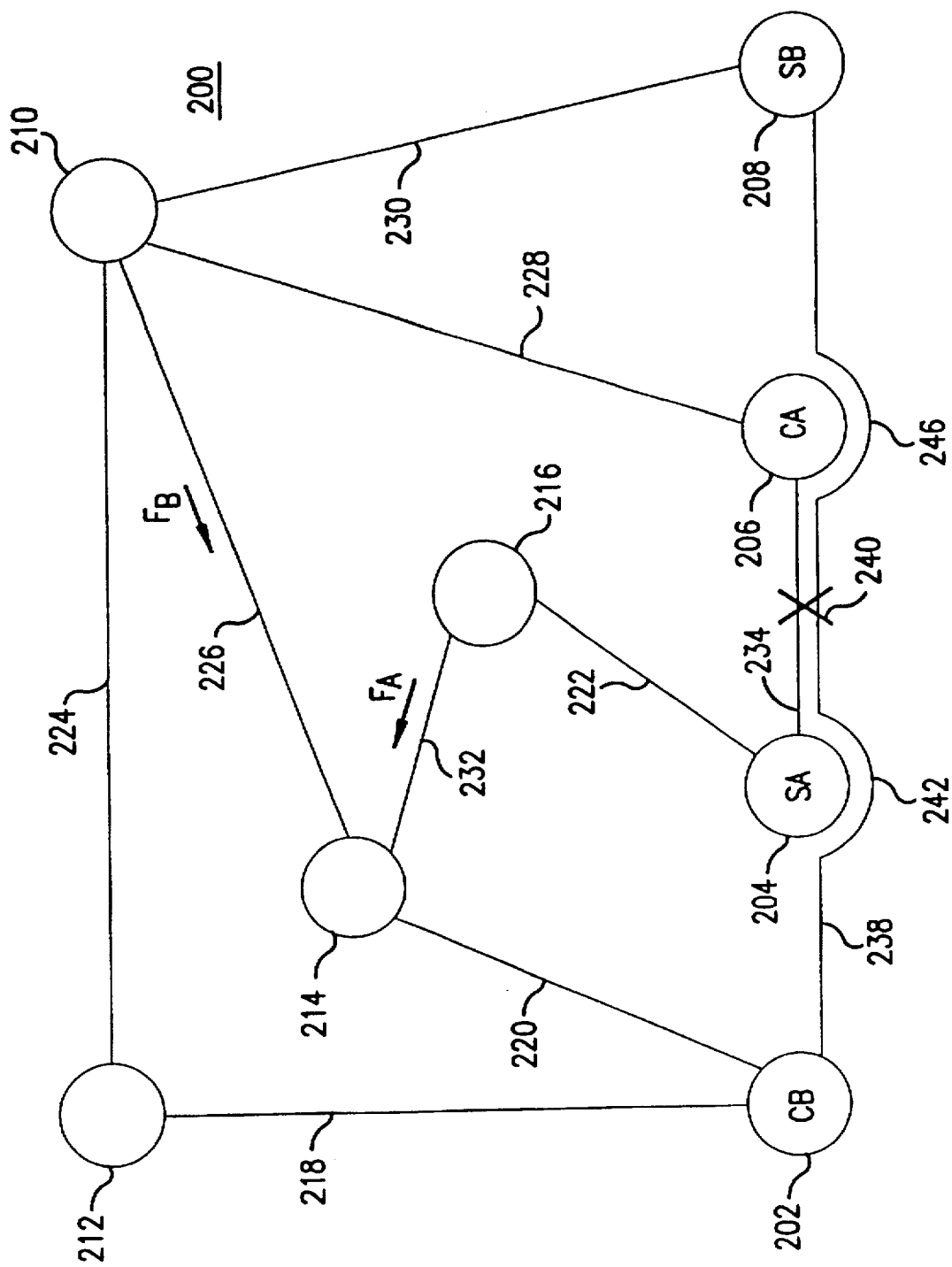
Figure 2C:
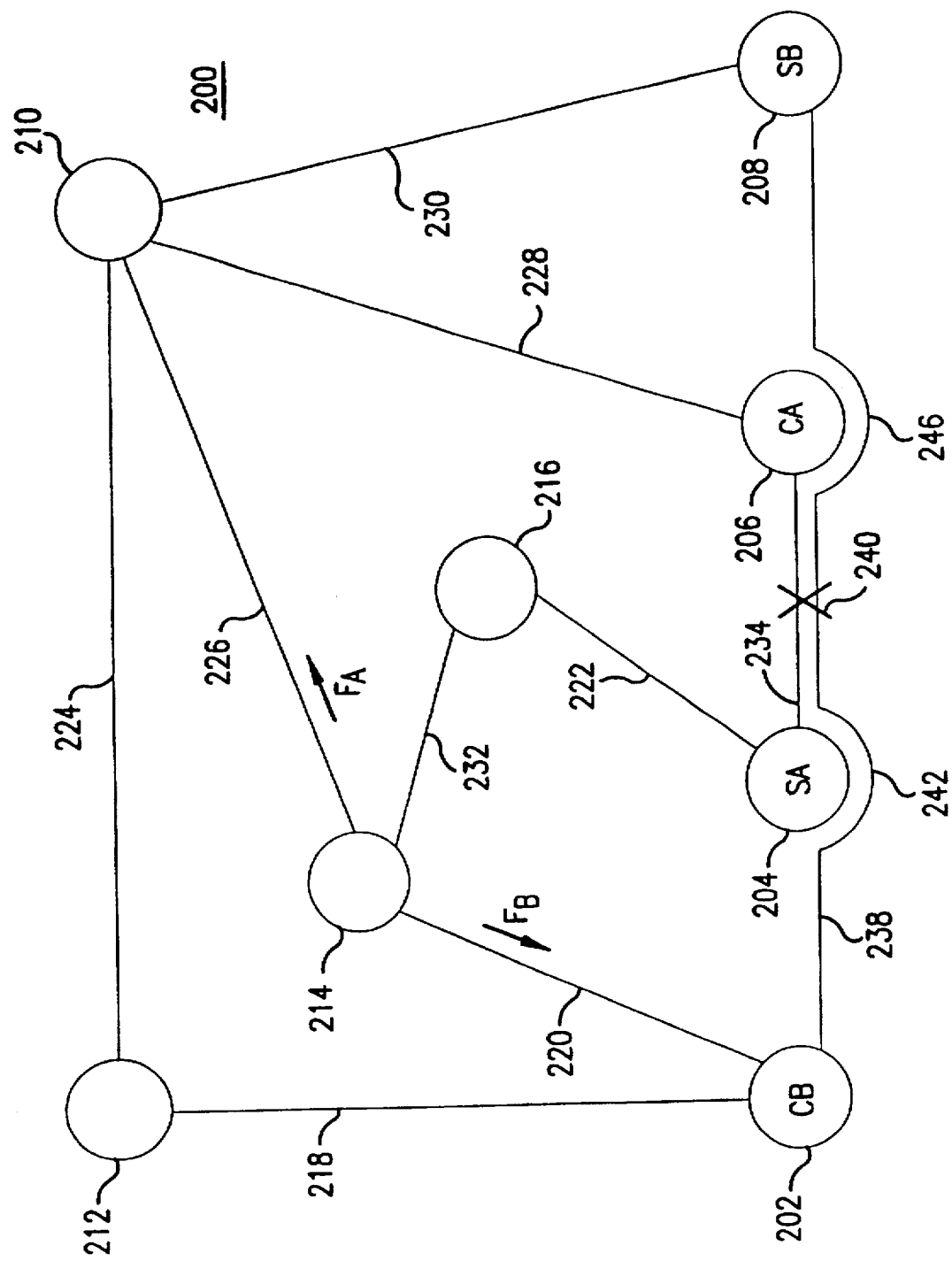
Figure 2D:
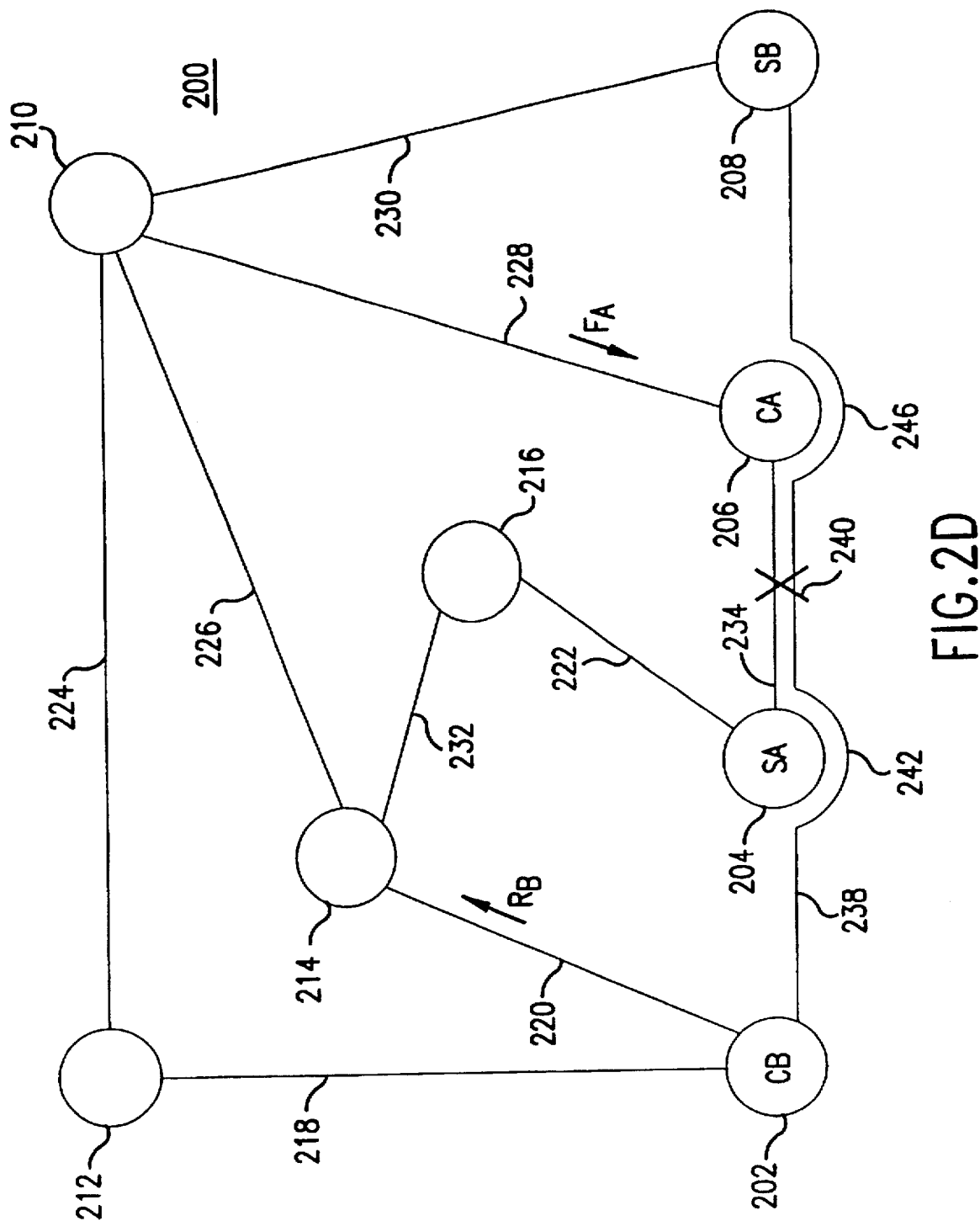

In FIG. 2B, node 216 propagates $F_A$ along link 232 and node 210 propagates $F_B$ along link 226. In FIG. 2C, node 214 propagates $F_A$ along link 226 and propagates $F_B$ along link 220. In FIG. 2D, Chooser B 202 generates a reverse restoration signal $R_B$ and transmits it along link 220; node 210 propagates $F_A$ along link 228.

Figure 2E:
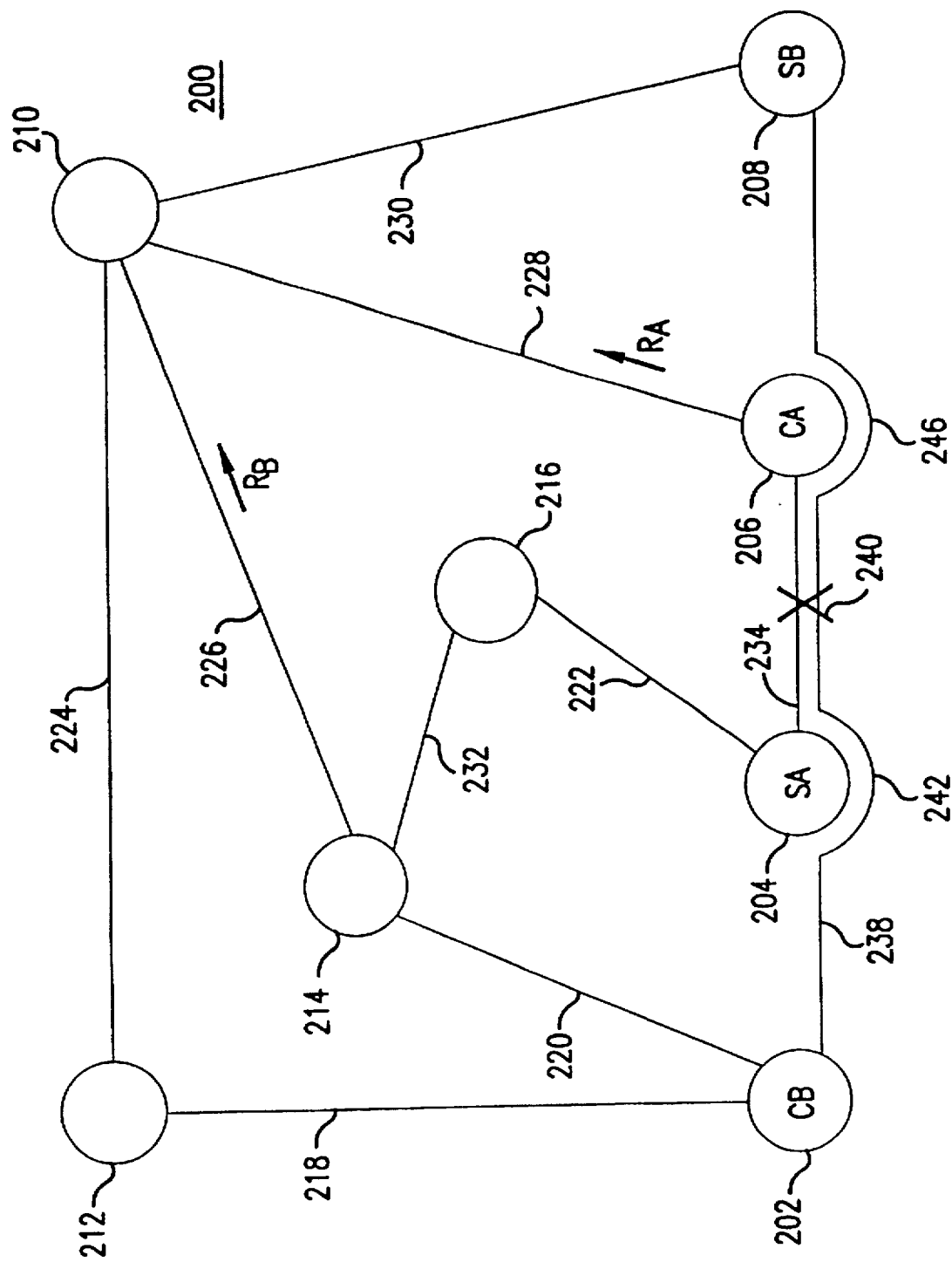

In FIG. 2E, Sender B 208 generates a reverse restoration signal $R_A$ and transmits it along link 228, node 214 propagates $R_B$ along link 226. At this point, the restoration of failed link 234 is doomed. Because the restoration process for failed link 238 has selected links 220 and 226 as part of its restoration path, these links are not available to the restoration process for failed link 234. Because the restoration process for failed link 234 has no path out of node 214, the restoration must fail. The condition causing this failure is known as "glare." Glare occurs when two restoration processes attempt to select the same link from opposite directions.

Figure 2F:
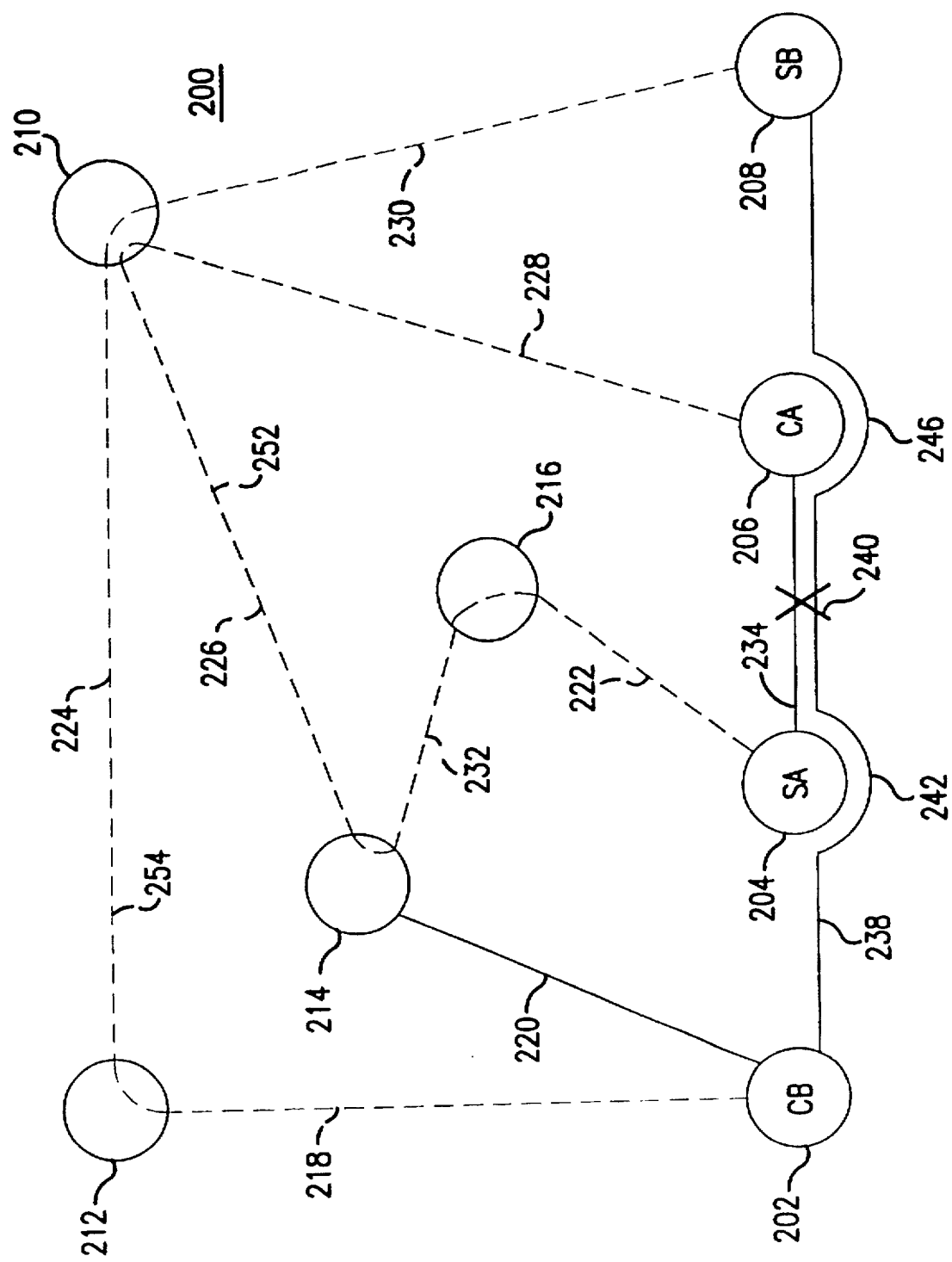
FIG. 2F illustrates a restoration path that would not be found by conventional mechanisms, but would be found by the present invention.

FIG. 2F depicts two restoration paths 252 and 254 that would successfully restore failed links 234 and 238, respectively, but could elude the logic of conventional network restoration mechanisms. Restoration path 252 comprises links 222, 232, 226, and 228. Restoration path 254 comprises links 218, 224, and 230. Restoration paths 252 and 254 would be found by the present invention if restoration signals $F_A$ and $R_A$ were assigned a higher priority than restoration signals $F_B$ and $R_B$.

In the discussion that follows, signals may also be referred to as signatures or messages. While there is a subtle difference among these terms to those skilled in the art, the differences are implementation-specific issues that do not affect the scope and spirit of the present invention. For the purposes of describing the invention herein, the terms signal, signature, and message are all understood in a broad sense simply as conveyances of data. Even though the data elements to be carried are exactly specified in accordance with the present invention, the mechanisms for transporting and processing, (for example, queued messages versus signatures imbedded in unused fields of the transport protocol) are presumed irrelevant.

The point at which a particular link enters or exits a node is referred to as a "port." From the point of view of the node, a connection to a spare link is considered to be a spare port. A port becomes unavailable in the present context whenever it is already actively carrying network traffic or is disabled due to malfunction. Spare ports can become unavailable during restoration processing as they become part of a chosen restoration path and begin carrying active traffic. The data processing facility within a given node is capable of maintaining in memory a data structure associated with each port attached to the node.

Figure 8A:
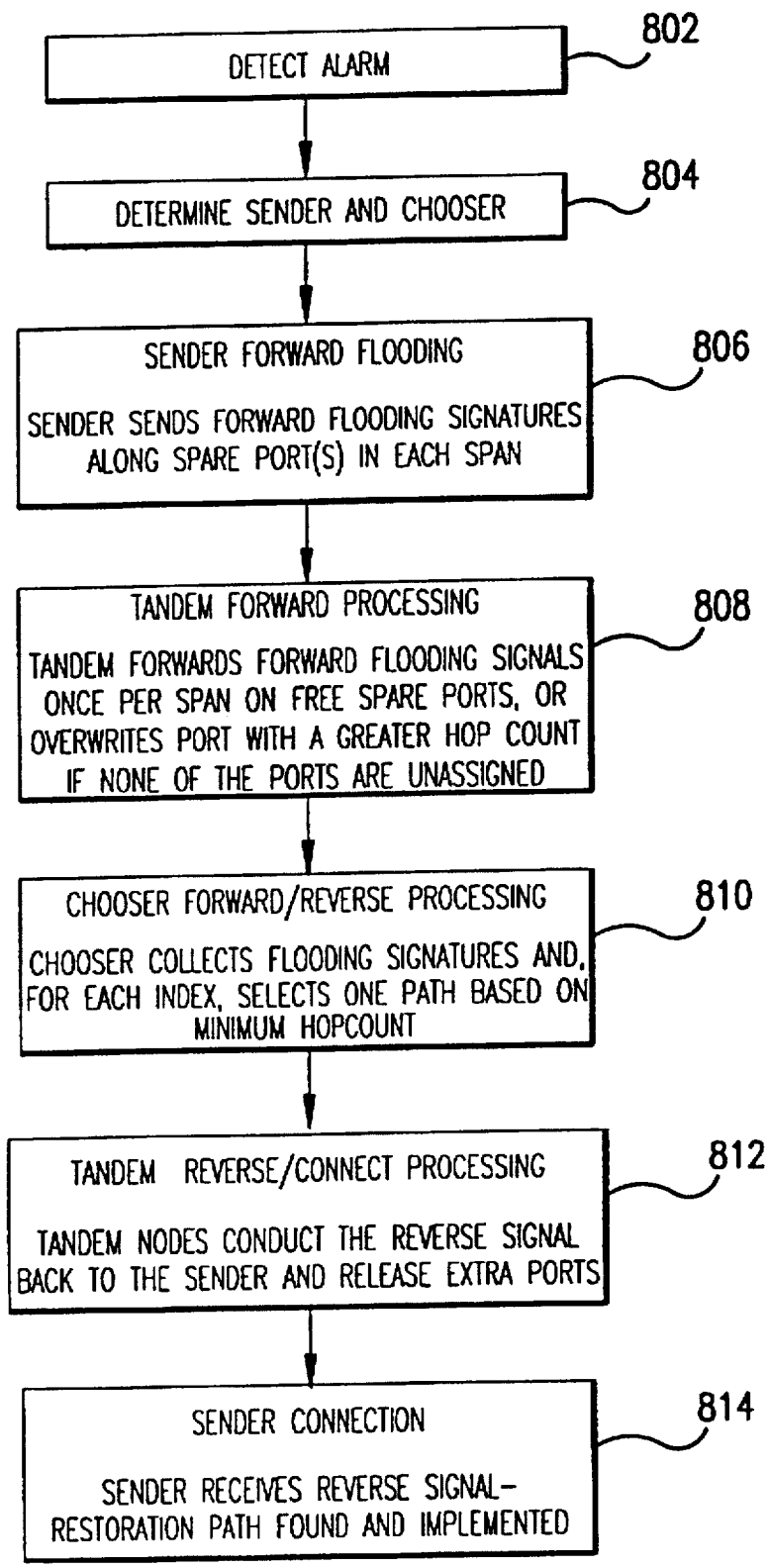
FIGS. 8A and 8B list the steps in a restoration approach contrasting conventional restoration mechanisms and the method of the present invention.
Figure 8B:
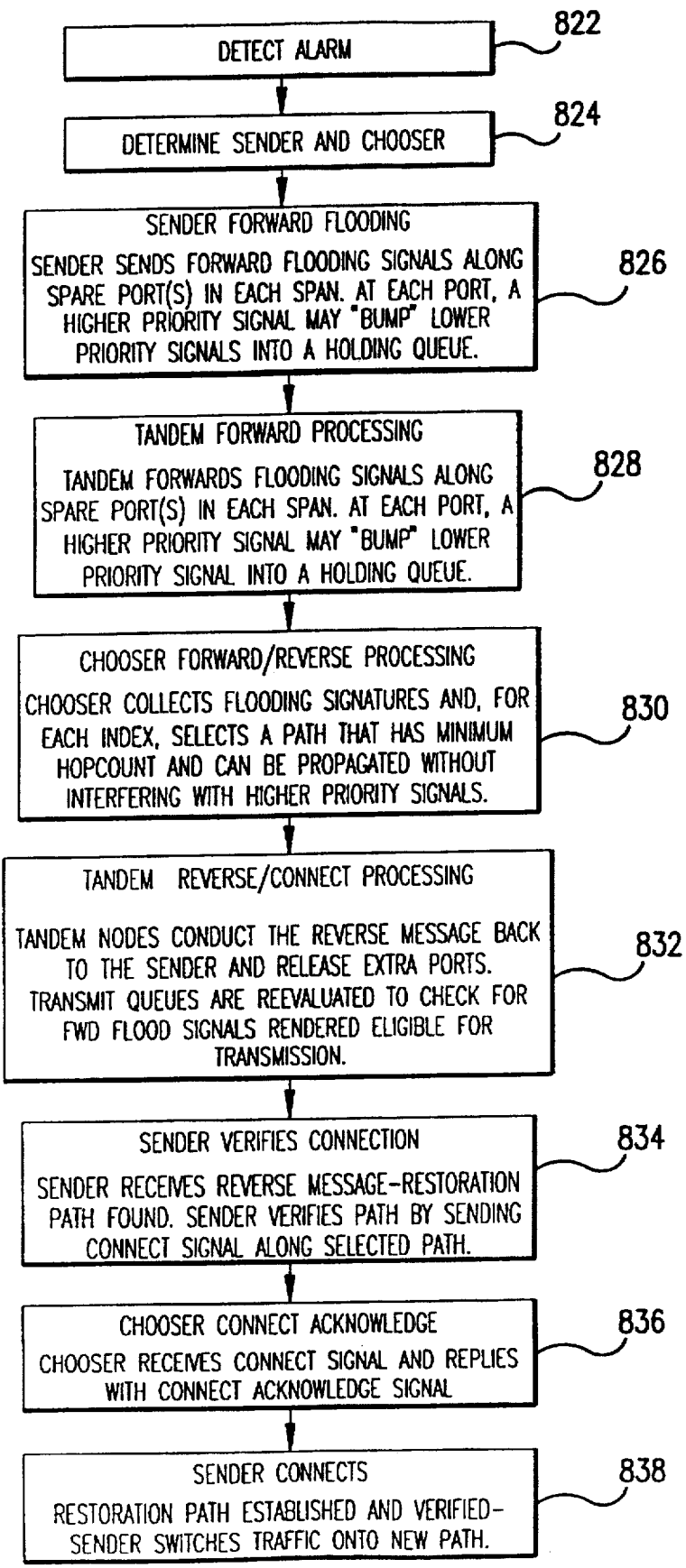

FIGS. 8A and 8B list the steps in a restoration approach contrasting conventional restoration mechanisms and the method of the present invention. FIG. 8A is a flowchart summarizing the sequence of restorative actions that take place according to conventional mechanisms. FIG. 8B is a flowchart summarizing the sequence of actions and nodal logical activity in accordance with the present invention. FIGS. 8A and 8B may be compared to highlight the differences of the present invention over conventional mechanisms.

Turning again to the figures, FIG. 8A is a flowchart showing the operation of conventional mechanisms. The restoration process and protocol begins when the network recognizes an alarm condition at step 802. The methods for detecting failure and generating alarms indicating failure of one or more links are commonly known to those skilled in the art and are presumed in this discussion. In step 804, the custodial nodes adjacent any failed links adopt the roles of Sender and Chooser using a mediation technique based on, for example, comparison of node ID's. The Sender node then originates special restoration signals along one spare port per span as listed in step 806.

Step 808 briefly states the actions of Tandem nodes that receive the restoration signals from a Sender in accordance with the cited Grover patent. Among spans other than the one through which the restoration signal entered the node, the logic searches for a spare link within each span that is not already designated for use. Note that a Sender may try to simultaneously restore several failed links within a single span. In accordance with the SHN protocol, such a Sender can seek multiple restoration paths by embedding a unique identifier, called an index, within the restoration signals to correspond to each failed link.

Step 810 outlines the Chooser node action in accordance with conventional mechanisms. Basically, the Chooser observes a number of restoration signals arriving along various spare links and makes a decision upon viable restoration path(s) with preference given to the shortest paths. In step 812, the selections made by the Chooser are communicated and implemented within the network by the propagation of specially structured signals called reverse signatures or reverse messages. These reverse signals are conducted by the intervening Tandem nodes to eventually reach the Sender in step 814, at which point a restoration path has been established and the Sender may divert traffic from the failed link onto the newly established restoration path to reach the Chooser.

Turning again to the figures, FIG. 8B is a flowchart showing the operation of the present invention. Step 822 signifies the recognition of a span failure. In step 824 the custodial nodes adjacent the failed span assume the roles of Sender and Chooser. These steps correspond to steps 802 and 804 of conventional mechanisms described in FIG. 8A.

Forward flooding signatures are then originated in step 826. In the context of multiple span failures in a network, multiple signatures can exist at a given port because a node may simultaneously act as a Sender or Tandem for several restoration processes. Therefore in step 826, the present invention introduces a novel technique for selective flooding. For each spare port, several candidate outgoing signatures are compared on the basis of priority. The one signature with the highest priority is selected to be dispatched along the port whereas the other signatures are placed into a holding queue. The details of this processing are discussed below in conjunction with FIG. 3.

Once forward flooding signatures are originated by a Sender in step 826, intervening Tandem nodes may receive the signatures and process them in step 828. As in step 826, the present invention employs a priority-based preemption and queuing scheme to accomplish selective flooding. The details of this processing are discussed below in conjunction with FIG. 4.

In step 830, the Chooser node receives and collects incoming forward flooding signatures, selects restorations paths, and then originates reverse linking signatures to enact the selected paths.

Another novel feature of the present invention is a prioritization and queuing scheme applied to the dispatching of outgoing reverse linking signatures. The details of this scheme are discussed below in conjunction with FIG. 5. Step 832 relates to the handling of reverse-linking signatures received by Tandem nodes. In accordance with the present invention, a prioritization scheme applied here assures that higher priority reverse linking signals are propagated whereas lower priority reverse linking signals are queued for later transmission. This logic is discussed in further detail below in conjunction with FIG. 6.

Steps 834 and 836 are additional protocol steps in accordance with a preferred embodiment of the present invention. When the Sender receives a reverse linking signal from a Chooser, the Sender performs a final check of the integrity of the new restoration path just prior to switching active traffic onto the new path.

For this purpose, a simple "connect" signal, composed in like manner to the forward flood or release signatures in conventional mechanisms (but with Message Type= "Connect"), is sent from the Sender to the Chooser in step 834. As a verification of the new path, the Chooser sends back a similarly composed "connect acknowledge" signal in step 836.

Finally, in step 838, the Sender receives the connect acknowledge signal and routes active traffic along the newly formed restoration path.

Figure 3:
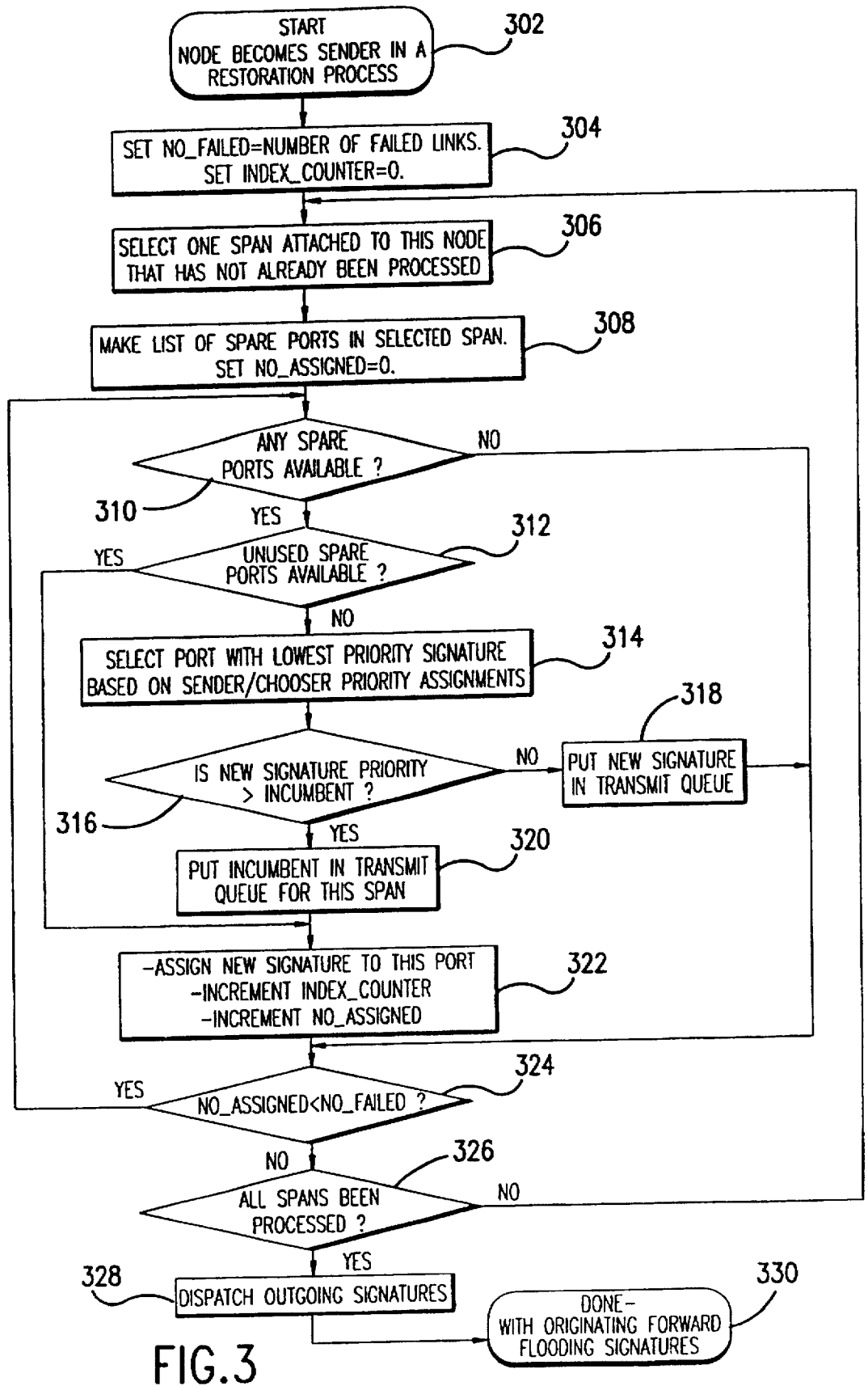
FIGS. 3 and 4 are flowcharts describing the logic exercised by Sender and Tandem nodes during the forward flooding phase of a restoration process in accordance with the present invention.

Referring now to FIG. 3 of the drawings, a flowchart is shown depicting the logic exercised by a Sender node in accordance with the present invention. The processing starts at step 302 when a particular node adopts the role of a Sender in a restoration process loosely based upon the SHN protocol, and creates a new signature to be asserted as a forward flood signal. In step 304, the newly formed Sender node assesses the number of failed links that need to be restored and also initializes an index counter used for assigning a unique identifier to each outgoing forward flood signal. These values are stored in variables NO_FAILED and INDEX_COUNTER, respectively.

In step 306, an unprocessed Sender node span is selected for subsequent processing. In step 308 a list of spare ports within the selected span is compiled, and an indicator, NO_ASSIGNED, is initialized to indicate that, as yet, no signatures have been assigned within the selected span.

In step 310, the port list is checked for spare ports, used or unused (that is, with or without assigned signatures, respectively), along the current span. If not, then processing continues at step 324 to select a different span for processing.

In steps 312 through 324, the Sender node attempts to generate outgoing forward flooding signatures and assign the signatures to available spare ports within the selected span. In step 312 the port list is checked for unused spare ports. If the list contains unused spare, then processing continues at step 322, wherein a forward flooding signature is assigned to one of the unused spare ports. Thus the present invention enforces a preference to assign signatures to unused spare ports.

If there are no unused spare ports available, then processing continues at step 314 as the logic seeks to find a used port with a lower priority signature that may be preempted by the new signature. In step 314, the list of spare ports is searched to determine the spare port that is currently assigned the lowest priority signature. In accordance with a preferred embodiment of the present invention the relative priority is based upon the Sender-Chooser identifications. FIG. 9 typifies a look-up table for mapping pairs of node ID's into an arbitrary relative priority number in accordance with one embodiment of the present invention.

In a preferred embodiment, the Sender node contains a look-up table of priority numbers indexed by Sender/Chooser pair as shown in FIG. 9. The relative priority of any Sender/Chooser pair can be determined by consulting such a look-up table. The contents of this table may be initialized when the network is first put into service or may be subsequently updated by some central network supervisory element. In this manner, a signature representing a given Sender/Chooser pair is compared on the basis of priority to a signature representing some other Sender/Chooser pair with the unambiguous result that one signal shall prevail over the other in the use of signaling ports. Unambiguous determination of relative priority can be guaranteed in all cases by assigning each Sender/Chooser pair to a priority number that is unique within the table.

For example, in FIG. 9 a priority look-up table 900 is indexed by Sender/Chooser ID's and populated with unique relative priority numbers 1 through 21. Those skilled in the art will recognize that node ID's can be designated in any form—alphanumeric or otherwise. The table itself may also be a linear table, linked list, or other equivalent data structure without departing from the spirit and cope of the present invention. The table entries may be of any values that allow comparison to one another. The relative priority of any given Sender/Chooser pair is determined from the contents of this table by finding the position Sender ID along row 902 and the Chooser ID along column 904. For example, the relative priority of Sender=201/Chooser=202 is found at table entry 906 to be equal to the number 21. Likewise, the relative priority of Sender=203/Chooser=204 is the number 17 as shown at the table entry 908.

In another embodiment of the present invention, priorities may be compared based upon some linear combination of the Sender/Chooser node ID's. This may be viewed as a degenerate case of the table described above. This second approach avoids the need to maintain a table and can adequately provide a definitive resolution of priorities to mediate spare port contention. However, this approach complicates implementing an arbitrary priority scheme because the node ID's must then be carefully chosen. The first approach using an independent look-up table makes the prioritization independent of node ID's and easier to change while the network is in operation. As would be apparent to a person skilled in the relevant art, other schemes can be employed without departing from the spirit and scope of the present invention.

In step 314, one of the above priority schemes or the like is used to examine the available spare ports, compare the priority of the signatures assigned to each, and select the spare port which is currently assigned the lowest priority signature.

In a step 316, one of the above priority schemes or the like is employed to compare the priority of two signatures to decide which one should be assigned to the port selected in step 314. One signature is the newly formed forward flooding signature, which the Sender node is attempting to dispatch to restore the failed links enumerated in step 304. (The formulation of new signatures in general is thoroughly explained in the Grover patent.) The other signature, an "incumbent" signature, is one that is already assigned to the selected port. Such an incumbent signature may exist, for example, by the action of the same node functioning as a Sender or a Tandem in the context of a separate restoration process. The net effect is that the higher priority signature is sent out through the selected port and the lower priority signature is moved into a transmit queue assigned to the selected port's span. The purpose of the queue is to hold all of the signatures that are attempting to use a spare port in the span.

If in step 316, it is determined that the new signature is of higher priority than the incumbent signature, then in step 320 the incumbent signature is moved into a transmit queue associated with the selected port's span and in step 322 the new signature is assigned to the selected port. Also in step 322, the INDEX_COUNTER is incremented in a manner consistent with the Grover patent. Further, in step 322, a NO_ASSIGNED variable is incremented for purposes of limiting, for a given failure, the number of outgoing flooding signatures along a span to the number of failed links in the damaged span.

If in step 316, it is determined that the new signature is of lower priority than the incumbent signature, then in step 318, the new signature is placed into the transmit queue associated with the port's span and the incumbent signature is allowed to remain the assigned signature. Processing then continues at step 324.

In step 324, the number of assigned signatures is compared to the number of failed links. If the number of assigned signatures is less than the number of failed links, then processing loops back to step 310 in order to attempt to assign another forward flood signature along a spare port in the current span. If not, then processing continues at step 326. Thus step 324 serves to continue assigning signatures to ports within a span until the number of assigned signatures equals the number of failed links. There is no need to propagate more forward signals along the same span than there are failed links.

After an attempt has been made to assign outgoing signatures to the spare ports along one span, another span can be selected for processing of outgoing signatures. In step 326, it is determined whether there are any remaining spans attached to the node that have not already been processed. If so, then processing loops back to step 306 to select another span for processing. If all spans have been processed then in step 328, the Sender node dispatches the assigned signatures on the spare ports. Step 330 signifies the end of Sender node processing in originating the forward flooding signatures.

Figure 4:
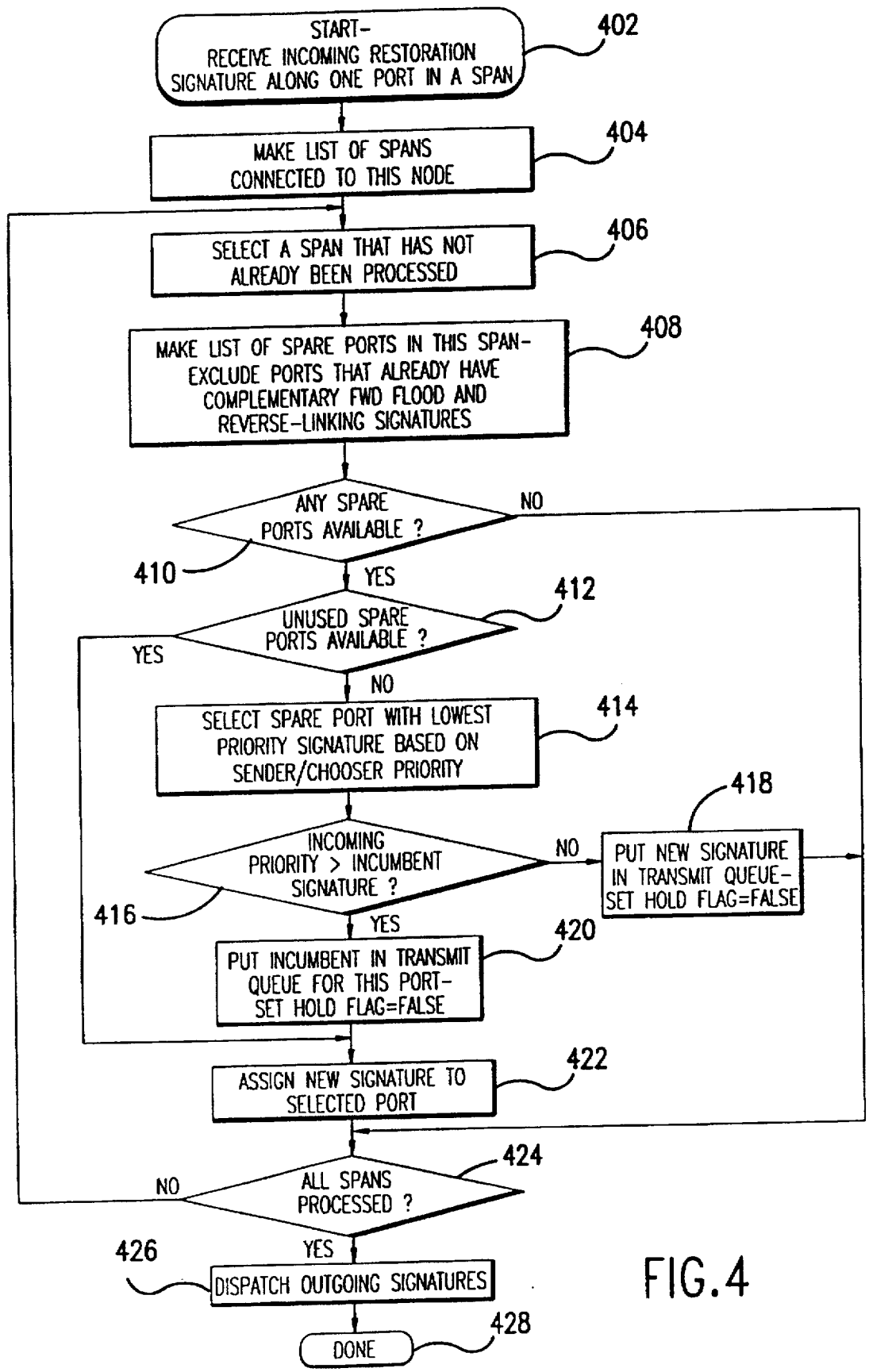

Referring now to FIG. 4 of the drawings, a flowchart is shown depicting the logical steps performed by a node that is serving in the role of Tandem with respect to a restoration process. According to the SHN protocol, this means that the particular node in question has received a forward flooding signature for which the node is neither the Sender nor Chooser. Processing begins in step 402 upon receipt of such a forward flooding signature from a Sender node. In step 404 a list of spans attached to the node is compiled to serve as a checklist to ensure processing of all spans. In step 406 one of the spans is selected for processing. In step 408 a list of spare ports within the selected span is compiled. To accomplish what is referred to in the present invention as "complemented incumbent" logic, this list of ports excludes any ports for which both a forward flooding signal and a corresponding reverse linking signal have been received. This complementation of signals indicates that the port has already been chosen as a part of a restoration path and, in the interest of preserving stability of new paths, should not be considered as a restoration candidate.

In step 410 the port list is checked for spare ports, used or unused, along the current span. If no spare ports are available on the span, then processing continues at step 424 to select a different span for processing. If a spare port is available, then processing continues at step 412.

In steps 412 through 422, the Tandem node attempts to generate outgoing forward flooding signatures and assign the signatures to available spare ports within the currently selected span. Step 412 ascertains whether there are any spare ports that do not already have signatures assigned. If there are any such unused spare ports, then processing continues at step 422, where a forward flooding signature is assigned to one unused port. In this manner step 412 enforces a preference to assign signatures to unused spare ports.

If no unused ports are available then processing continues at step 414 as the logic seeks to find a port with a lower priority signature that may be preempted by the new signature. In step 414, the list of spare ports is searched to determine the spare port that is currently assigned the lowest priority signature. As described earlier, the relative priority is based upon the Sender-Chooser identifications. The spare port that is identified in step 414 is then used as a processing context for step 416.

In step 416, a similar prioritization scheme is employed to compare the priority of two signatures to decide which one should be assigned to the selected port. One signature is a newly formed forward flooding signature derived from the incoming signal received in step 402. (The formulation of derivative signatures in general is thoroughly explained in the Grover patent.) The other signature, an "incumbent" signature, is one that is already assigned to the port by the action of the same node functioning as a Sender or a Tandem in the context of a separate restoration process.

Each signature in the transmit queue has an associated HOLD FLAG, which indicates whether the signature is eligible for retransmission at a later time. As will be explained in FIGS. 6 and 7, this eligibility may be revoked and reinstated during the course of restoration processing. A false HOLD FLAG value associated with a particular queued signature indicates that the signature may be transmitted should it later become the highest priority signature in the transmit queue.

If in step 416 it is determined that the new signature is of higher priority than the incumbent signature, then in step 420 the incumbent signature is moved into a transmit queue associated with the port's span and is assigned a HOLD FLAG value of "false." In step 422, the new signature is assigned to the port. Processing then continues at step 424.

Returning to step 416, if the new signature is found to be of lower priority than the incumbent signature, then in step 418 the new signature is placed into the transmit queue associated with the port's span and is assigned a HOLD FLAG value of "false." The incumbent signature remains the signature assigned to the port. Processing then continues at step 424.

After an attempt has been made to assign outgoing signatures to the spare ports along one span, another span can be processed. In step 424 it is determined whether there are any remaining spans attached to the node that have not already been processed. If so, then processing loops back to step 406 to select another span for processing. If all spans have been processed, then in step 426 the Sender node dispatches the assigned signatures on the spare ports. Step 428 represents the end of Sender node processing in originating the forward flooding signatures.

In accordance with the SHN protocol, the forward flooding signatures spread through the network. If there is at least one viable path of spare links joining the Sender to the Chooser, then eventually one or more of the signatures emanating from the Sender node will reach the corresponding Chooser node.

For a predetermined period of time after the initial failure, the Chooser node records the arriving signatures in some form of data structure. As would be apparent to a person skilled in the relevant art, the period of time and the form of data structure are design choices which may vary without departing from the scope and spirit of the present invention. In the present discussion, this data structure is referred to as the "S/C/I table" to denote the classification of its contents based on Sender ID/Chooser ID/Index.

According to a preferred embodiment of the present invention, the Chooser continues to record the incoming signatures until a determination is made that the Chooser has received all expected forward signals or at least an adequate number thereof This determination may be based on, for example, a fixed time limit or some algorithm involving signal content or arrival interval. As would be apparent to a person skilled in the relevant art, other methods may be employed without departing from the scope and spirit of the present invention.

Figure 5:
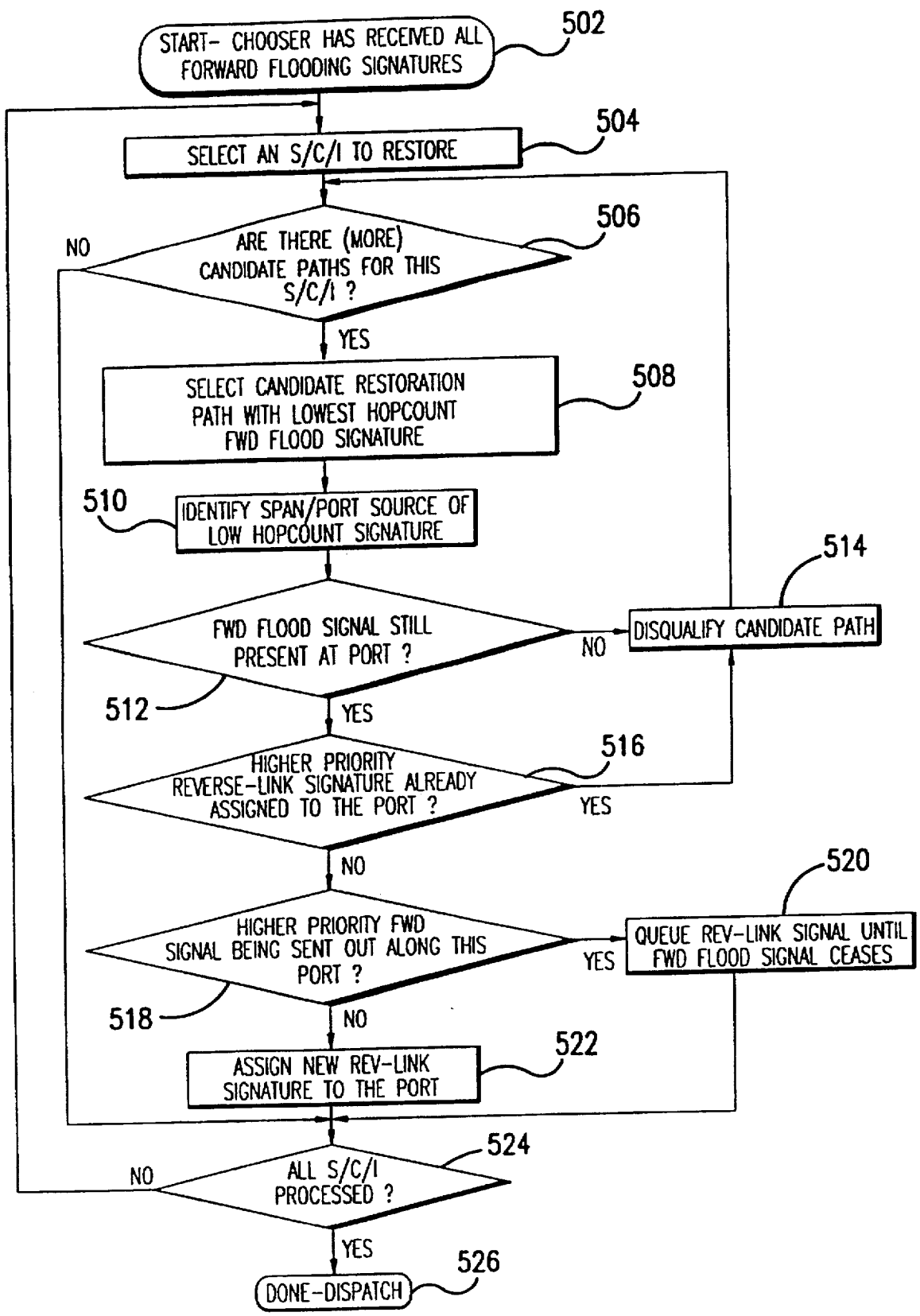
FIGS. 5 and 6 are flowcharts describing the logic exercised by Chooser and Tandem nodes during the reverse linking phase of a restoration process in accordance with the present invention.

The reverse messaging stage begins with step 502 of FIG. 5 when a determination is made that the Chooser has received all expected forward signals or at least an adequate number thereof The Chooser then proceeds according to the logic of FIG. 5 to properly select the restoration paths.

In step 504 one of the S/C/I combinations from the Chooser table is selected. In step 506, it is determined whether the S/C/I table contains any entries as candidate restoration paths that have not already been reviewed and disqualified. Therefore, step 506 establishes a loop that, for each S/C/I, iterates through all possible restoration paths until either a restoration path has been found or the list of possible paths is exhausted.

In step 508 the table is accessed to retrieve the signature received for the selected S/C/I during the forward flooding stage having the lowest hopcount. In step 510, the span and port through which the low hopcount forward signal was received are recalled because the original span and port of receipt are preferred for dispatching a corresponding reverse signal.

In step 512 the Chooser node verifies that the particular forward flooding signal that was identified in step 508 is still actually being received at the port identified in step 510. This is an advisable practice within the present invention because forward flooding signatures may be preempted at outgoing Sender and Tandem ports. This implies that a given forward flooding signature may reach the intended Chooser node and then subside. If the forward flooding signal is not present, then in step 514 the S/C/I table entry that was identified in step 508 is tagged as being disqualified as a restoration path. Processing then jumps to step 506 to seek other candidate paths for the current S/C/I.

In step 516, the priority of the candidate outgoing reverse link signal is compared to the priority of the incumbent outgoing signature, if any, at the port identified in step 510. If the incumbent signature has greater priority, then no new reverse linking signature is assigned to the port and in step 514 the S/C/I table entry that was identified in step 508 is tagged as being disqualified as a restoration path. Processing then jumps to step 506 to seek other candidate paths for the current S/C/I.

If the new reverse-link signature is of higher priority than any incumbent reverse signature, then processing continues in step 518 to compare the priority of the new reverse-link signature to the priority of any incumbent outgoing forward flooding signature at the port. This is a possible scenario when multiple restoration processes operate concurrently. If in step 518 it is determined that the reverse linking signal is of greater priority than any incumbent forward flooding signal then the new signature supersedes the incumbent and is assigned to the port in step 522. The deposed incumbent signature is queued for transmission an another spare port in this span.

If, on the other hand, an incumbent forward flooding signal is found at the current port that is of greater priority that the candidate outgoing reverse link signal, the reverse signal is simply placed into a transmit queue to await the possible cessation of the incumbent signal.

Upon entering step 524, the Chooser processing along a particular span is complete. Steps 504 through 522 iterate until all spans attached to the Chooser have been processed. When all spans have been processed, then in step 526 the assigned reverse linking signals are dispatched on the appropriate ports. Thus the Chooser reverse processing is complete.

Figure 6:
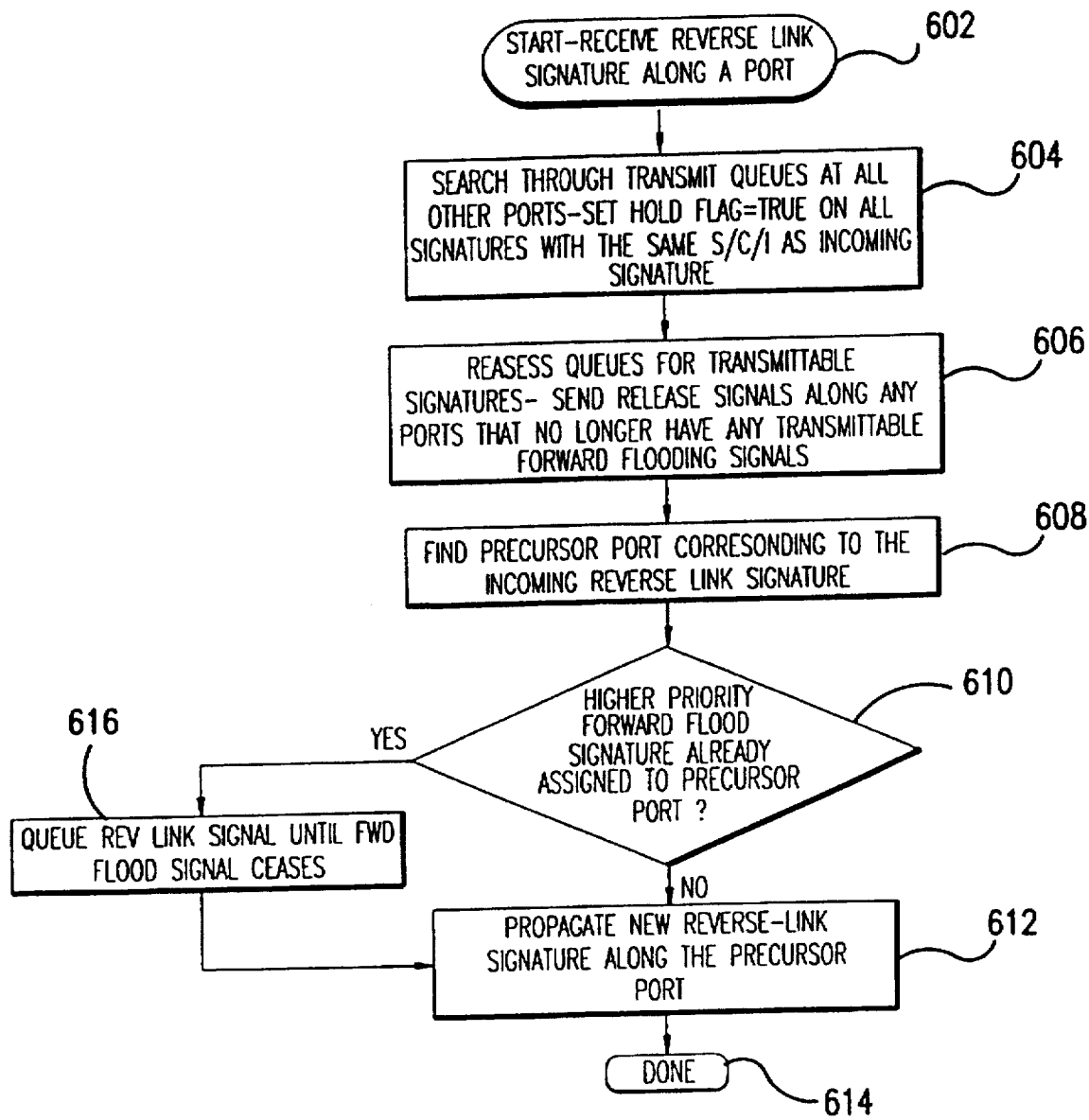

FIG. 6 depicts the logical steps that occur in Tandem nodes that receive reverse linking signatures during the reverse linking phase of the SHN protocol. In step 602 the Tandem reverse processing is initiated upon the receipt by a Tandem node of a reverse link signature from a Chooser node. As generally provided for in the Grover patent, the receipt of a reverse link signature on a particular port indicates that a restoration path has been chosen by a Chooser node and that any corresponding forward flooding signals that are emanating along other ports should be canceled.

Steps 604 and 606, then, represent a modification of this logic as a feature of the present invention. In step 604, all of the transmit queues in the node are scanned to find any signatures that have the same S/C/I identifiers as the reverse link signature. For each matching forward flood signature in every transmit queue, a logical HOLD FLAG is set "true." This action renders the affected signatures ineligible for further transmission but does not discard them from the queue. In step 606 the contents of each transmit queue are reviewed to determine which signatures shall be assigned to each port. Following the actions of step 604, some high priority signatures in the transmit queues have been rendered ineligible. For any port that no longer has any eligible forward flooding signatures, a release signal is originated from the port to free any spare paths connected thereto.

In step 608 the reverse signal is correlated with records of forward signals that were passed by the Tandem earlier during the forward flooding stage. This is done to determine how to propagate the reverse signature back to the appropriate Sender along the same span that a corresponding forward signal from the Sender had traversed earlier.

In step 610, the port identified in step 608 is examined to determine if a forward flooding signature is already assigned to the port and to compare the priority of any such signature to the priority of the incoming reverse link signature. If the incumbent forward flooding signature is of higher priority than the incoming reverse link signature, then the processing jumps to termination at step 614. Note that the candidate reverse link signature is queued for transmission should the incumbent signal cease.

Otherwise, if there is no incumbent forward flooding signature at the precursor port or any such incumbent signature is of lower priority than the incoming signature, then in step 612 the incoming reverse linking signature is assigned to be propagated along the precursor port. A lower priority incumbent signature is queued for transmission on another spare port in this span. The processing is then completed in step 614.

The processing of FIG. 6 implies that a reverse linking signature being received by a Tandem node can suddenly disappear due to preemption by a higher priority reverse link signature. In fact, the same signal may also subsequently reappear as a result of other processing dynamics taking place in the network.

Figure 7:
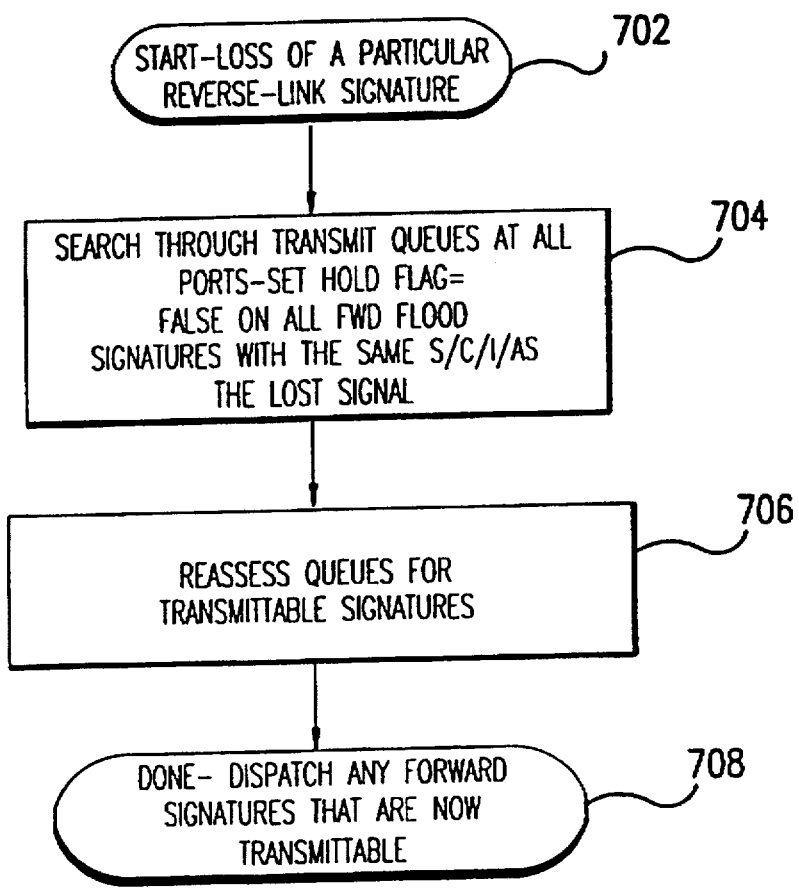
FIG. 7 is a flowchart depicting the logical steps performed by nodes upon loss of a reverse linking signal.

FIG. 7 is a flowchart depicting the logical steps exercised by any node that loses a reverse link signature. Step 702 represents the start of this process by the loss of a particular reverse-linking signature. Further processing occurs in the context of this particular lost signal. Step 704 consists of searching through all of the transmit queues in the Tandem node to find forward flooding signals with the same Sender/Chooser/Index combination as the lost reverse link signal. Any such signals that are found are made eligible for retransmission by setting the HOLD FLAG associated with each one to "false."

As described earlier in accordance with the present invention, only the highest priority eligible signal in each transmit queue will be propagated along the port. Because the processing of step 704 may alter the eligibility of the queue contents, it is then necessary in step 706 to reassess the contents of each queue and decide the single correct signature that should be propagated along each port.

Finally, in step 708, signatures assigned in step 706 are dispatched and the process of handling loss of a reverse linking signature is complete. Subsequent reacquisition of a particular reverse-linking signature is adequately handled by the logic of FIG. 6.

The net effect of this logic is to reenable the sending of forward flooding signals that had been suspended when the reverse linking signal was present. In this way multiple restoration processes may proceed without undue interference. In fact, the present invention assures that diverse restoration processes do not have serialization enforced. Overlapping restoration processes undergo serialization in space and time only where necessary.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority;

(c) selectively transmitting said forward restoration signature from said SENDER node based on said unique priority, including the steps of (i) attempting to assign said forward restoration signature to each spare port in said SENDER node, including the steps of (1) for each spare port currently assigned a further restoration signature having a priority lower than said unique priority, moving said further restoration signature to a queue associated with said spare port and assigning said forward restoration signature to said spare port, (2) for each spare port currently assigned a further restoration signature having a priority higher than said unique priority, moving said forward restoration signature to a queue associated with said spare port, and (3) for each spare port not currently assigned a restoration signature, assigning said forward restoration signature to said spare port, and (ii) transmitting said restoration signatures assigned to said spare ports of said SENDER node;

(d) upon receipt of said forward restoration signature at a first spare port on at least one TANDEM node, modifying said forward restoration signature and selectively transmitting said modified forward restoration signature based on said unique priority;

(e) upon receipt of said modified forward restoration signature on a second spare port on said CHOOSER node, selectively executing the following sub-steps based on said unique priority:

(i) connecting said second working port to said second spare port, and (ii) transmitting a reverse restoration signature having said unique priority on said second spare port;

(f) upon receipt of said reverse restoration signature at a third spare port on said at least one TANDEM node, selectively executing the following sub-steps based on said unique priority:

(i) connecting said third spare port to said first spare port, (ii) modifying said reverse restoration signature, and (iii) transmitting said modified reverse restoration signature on said first spare port; and (g) on receipt of said modified reverse restoration signature at a fourth spare port on said SENDER node, connecting said first working port to said fourth spare port, to thereby restore communications between said pair of nodes.

2. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority and an S/C/I value including the identity of said SENDER node, the identity of said CHOOSER node, an INDEX value, and a predetermined initial HOPCOUNT value;

(c) selectively transmitting said forward restoration signature from said SENDER node based on said unique priority;

(d) upon receipt of said forward restoration signature at a first spare port on at least one TANDEM node, modifying said forward restoration signature and selectively transmitting said modified forward restoration signature based on said unique priority, including the steps of (i) if said at least one TANDEM node has a spare port currently assigned a restoration signature having the same S/C/I value as said forward restoration signature, selectively assigning said forward restoration signature to said spare port based on said HOPCOUNT value of said forward restoration signal, (ii) if said TANDEM node has no spare port currently assigned a restoration signature having the same S/C/I value as said forward restoration signature, modifying said forward restoration signature by incrementing said HOPCOUNT value of said forward restoration signature and attempting to assign said modified forward restoration signature to each spare port, including the steps of (1) for each spare port currently assigned a further restoration signature having a priority lower than said unique priority, moving said further restoration signature to a queue associated with said spare port and assigning said modified forward restoration signature to said spare port, (2) for each spare port currently assigned a further restoration signature having a priority higher than said unique priority, moving said modified forward restoration signature to a queue associated with said spare port, and (3) for each spare port not currently assigned a restoration signature, assigning said modified forward restoration signature to said spare port, and (iii) transmitting said restoration signatures assigned to said spare ports;

(e) upon receipt of said modified forward restoration signature on a second spare port on said CHOOSER node, selectively executing the following sub-steps based on said unique priority:

(i) connecting said second working port to said second spare port, and (ii) transmitting a reverse restoration signature having said unique priority on said second spare port;

(f) upon receipt of said reverse restoration signature at a third spare port on said at least one TANDEM node, selectively executing the following sub-steps based on said unique priority:

(i) connecting said third spare port to said first spare port, (ii) modifying said reverse restoration signature, and (iii) transmitting said modified reverse restoration signature on said first spare port; and (g) on receipt of said modified reverse restoration signature at a fourth spare port on said SENDER node, connecting said first working port to said fourth spare port, to thereby restore communications between said pair of nodes.

3. The method of claim 2, wherein step (i) comprises the steps of:

(1) if said at least one TANDEM node has a spare port currently assigned a restoration signature having the same S/C/I value as said forward restoration signature, and the same HOPCOUNT value as said forward restoration signature, discarding said forward restoration signature, (2) if said at least one TANDEM node has a spare port currently assigned a restoration signature having the same S/C/I value as said forward restoration signature, and a lower HOPCOUNT value than said forward restoration signature, discarding said forward restoration signature;

(3) if said at least one TANDEM node has a spare port currently assigned a restoration signature having the same S/C/I value as said forward restoration signature, and a higher HOPCOUNT value than said forward restoration signature, assigning said forward restoration signature to said spare port.

4. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority and an S/C/I value including the identity of said SENDER node, the identity of said CHOOSER node, an INDEX value, and a predetermined initial HOPCOUNT value;

(c) selectively transmitting said forward restoration signature from said SENDER node based on said unique priority;

(d) upon receipt of said forward restoration signature at a first spare port on at least one TANDEM node, modifying said forward restoration signature and selectively transmitting said modified forward restoration signature based on said unique priority;

(e) upon receipt of said modified forward restoration signature on a second spare port on said CHOOSER node, selectively executing the following sub-steps based on said unique priority:

(i) generating a reverse restoration signature having said unique priority and an S/C/I value including the identity of said SENDER node, the identity of said CHOOSER node, an INDEX value, and a predetermined initial HOPCOUNT value, (ii) if a further reverse restoration signature having a priority higher than said unique priority is assigned to said second spare port, discarding said reverse restoration signature, (iii) if a forward restoration signature having a priority higher than said unique priority is assigned to said second spare port, moving said reverse restoration signature into a queue associated with said second spare port, (iv) if no further reverse restoration signature having a priority higher than said unique priority is assigned to said second spare port, and no forward restoration signature having a priority higher than said unique priority is assigned to said second spare port, assigning said reverse restoration signature to said second spare port and connecting said second working port to said second spare port, and (v) transmitting said reverse restoration signature assigned to said second spare port;

(f) upon receipt of said reverse restoration signature at a third spare port on said at least one TANDEM node, selectively executing the following sub-steps based on said unique priority:

(i) connecting said third spare port to said first spare port, (ii) modifying said reverse restoration signature, and (iii) transmitting said modified reverse restoration signature on said first spare port; and (g) on receipt of said modified reverse restoration signature at a fourth spare port on said SENDER node, connecting said first working port to said fourth spare port, to thereby restore communications between said pair of nodes.

5. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority and an S/C/I value including the identity of said SENDER node, the identity of said CHOOSER node, an INDEX value, and a predetermined initial HOPCOUNT value;

(c) selectively transmitting said forward restoration signature from said SENDER node based on said unique priority;

(d) upon receipt of said forward restoration signature at a first spare port on at least one TANDEM node, modifying said forward restoration signature and selectively transmitting said modified forward restoration signature based on said unique priority;

(e) upon receipt of said modified forward restoration signature on a second spare port on said CHOOSER node, selectively executing the following sub-steps based on said unique priority:

(i) connecting said second working port to said second spare port, and (ii) transmitting on said second spare port a reverse restoration signature having said unique priority and an S/C/I value including the identity of said SENDER node, the identity of said CHOOSER node, an INDEX value, and a predetermined initial HOPCOUNT value;

(f) upon receipt of said reverse restoration signature at a third spare port on said at least one TANDEM node, selectively executing the following sub-steps based on said unique priority:

(i) rendering all queued restoration signatures having the same S/C/I value as said reverse restoration signature ineligible for transmission, (ii) sending release signals on all spare ports having no eligible forward restoration signatures, (iii) if said first spare port is currently assigned a forward restoration signature having a priority higher than said unique priority, moving said reverse restoration signature into a queue associated with said first spare port, and (iv) if said first spare port is currently assigned a forward restoration signature having a priority lower than said unique priority, connecting said third spare port to said first spare port, modifying said reverse restoration signature by incrementing the HOPCOUNT value of said reverse restoration signature, and transmitting said modified reverse restoration signature on said first spare port; and (g) on receipt of said modified reverse restoration signature at a fourth spare port on said SENDER node, connecting said first working port to said fourth spare port, to thereby restore communications between said pair of nodes.

6. The method of claim 5, wherein step (iii) comprises the steps of:

(1) if said first spare port is currently assigned a forward restoration signature having a priority higher than said unique priority, rendering all queued forward restoration signatures having the same S/C/I value as said reverse restoration signature eligible for transmission, (2) for each queue associated with a spare port, if the restoration signature assigned to said spare port is of lower priority than an eligible forward restoration signature in said queue, moving said restoration signature to said queue and assigning said eligible forward restoration signature to said spare port, and (3) transmitting said forward restoration signatures assigned to said spare ports.

7. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority and an S/C/I value including the identity of said SENDER node, the identity of said CHOOSER node, an INDEX value, and a predetermined initial HOPCOUNT value;

(c) selectively transmitting said forward restoration signature from said SENDER node based on said unique priority;

(d) upon receipt of said forward restoration signature at a first spare port on at least one TANDEM node, modifying said forward restoration signature and selectively transmitting said modified forward restoration signature based on said unique priority;

(e) upon receipt of said modified forward restoration signature on a second spare port on said CHOOSER node, selectively executing the following sub-steps based on said unique priority:

(i) connecting said second working port to said second spare port, and (ii) transmitting on said second spare port a reverse restoration signature having said unique priority and an S/C/I value including the identity of said SENDER node, the identity of said CHOOSER node, an INDEX value, and a predetermined initial HOPCOUNT value;

(f) upon receipt of said reverse restoration signature at a third spare port on said at least one TANDEM node, selectively executing the following sub-steps based on said unique priority:

(i) connecting said third spare port to said first spare port, (ii) modifying said reverse restoration signature, and (iii) transmitting said modified reverse restoration signature on said first spare port;

(g) on receipt of said modified reverse restoration signature at a spare port on said SENDER node, sending a connect signal from said SENDER node to said CHOOSER node along the path described by said modified reverse restoration signature;

(h) on receipt of said connect signal by said CHOOSER node, sending a connect acknowledge signal from said CHOOSER node along said path to said SENDER node; and (i) on receipt of said connect acknowledge signal at said spare port on said SENDER node, connecting said fourth spare port to said first working port, to thereby restore communications between said pair of nodes.

8. A method for restoring interrupted communications between a pair of nodes in a network having a plurality of nodes interconnected by spans, wherein each span comprises at least one link, wherein each link connects two nodes at node ports, the ports being either working ports or spare ports, the method comprising the steps of:

(a) designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) creating a forward restoration signature having a unique priority and an S/C/I value including the identity of said SENDER node, the identity of said CHOOSER node, an INDEX value, and a predetermined initial HOPCOUNT value;

(c) selectively transmitting said forward restoration signature from said SENDER node based on said unique priority;

(d) upon receipt of said forward restoration signature at a first spare port on at least one TANDEM node, modifying said forward restoration signature and selectively transmitting said modified forward restoration signature based on said unique priority;

(e) upon receipt of said modified forward restoration signature on a second spare port on said CHOOSER node, selectively executing the following sub-steps based on said unique priority:

(i) connecting said second working port to said second spare port, (ii) accumulating received modified forward restoration signatures for a predetermined period of time, (iii) grouping said modified forward restoration signatures by S/C/I value to form groups;

(iv) for each of said groups, selecting the modified forward restoration signature having the lowest HOPCOUNT value, (v) generating a reverse restoration signature having said unique priority and an S/C/I value including the identity of said SENDER node, the identity of said CHOOSER node, an INDEX value, and a predetermined initial HOPCOUNT value, and (vi) selectively transmitting said reverse restoration signature on said second spare port based on said unique priority;

(f) upon receipt of said reverse restoration signature at a third spare port on said at least one TANDEM node, selectively executing the following sub-steps based on said unique priority:

21

(i) connecting said third spare port to said first spare port,
(ii) modifying said reverse restoration signature, and
(iii) transmitting said modified reverse restoration signature on said first spare port; and (g) on receipt of said modified reverse restoration signature at a fourth spare port on said SENDER node, connecting said first working port to said fourth spare port, to thereby restore communications between said pair of nodes.

9. The method of claim 8, wherein step (vi) comprises the steps of:

(1) if a further reverse restoration signature having a priority higher than said unique priority is assigned to said second spare port, discarding said reverse restoration signature,
(2) if a forward restoration signature having a priority higher than said unique priority is assigned to said second spare port, moving said reverse restoration signature into a queue associated with said second spare port,
(3) if no reverse restoration signature having a priority higher than said unique priority is assigned to said second spare port, and no forward restoration signature having a priority higher than said unique priority is assigned to said second spare port, assigning said reverse restoration signature to said second spare port, and
(4) transmitting said reverse restoration signature assigned to said second spare port.

10. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;
(b) means for creating a forward restoration signature having a unique priority;
(c) means for selectively transmitting said forward restoration signature from said SENDER node based on said unique priority, including
  (i) means for attempting to assign said forward restoration signature to each spare port in said SENDER node, including
    (1) means for moving said further restoration signature to a queue associated with said spare port and assigning said forward restoration signature to each spare port currently assigned a further restoration signature having a priority lower than said unique priority,
    (2) means for moving said forward restoration signature to a queue associated with each spare port currently assigned a further restoration signature having a priority higher than said unique priority, and
    (3) means for assigning said forward restoration signature to each spare port not currently assigned a restoration signature, and
  (ii) means for transmitting said restoration signatures assigned to said spare ports of said SENDER node;

22

(d) means for modifying said forward restoration signature and selectively transmitting said modified forward restoration signature based on said unique priority upon receipt of said forward restoration signature at a first spare port on at least one TANDEM node;
(e) means for selectively connecting said second working port to a second spare port on said CHOOSER node and transmitting a reverse restoration signature having said unique priority on said second spare port based on said unique priority upon receipt of said modified forward restoration signature on said second spare port;
(f) means for selectively connecting a third spare port on said at least one TANDEM node to said first spare port, modifying said reverse restoration signature, and transmitting said modified reverse restoration signature on said first spare port based on said unique priority upon receipt of said reverse restoration signature at said third spare port; and
(g) means for connecting said first working port to a fourth spare port on said SENDER node on receipt of said modified reverse restoration signature at said fourth spare port, to thereby restore communications between said pair of nodes.

11. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;
(b) means for creating a forward restoration signature having a unique priority and an S/C/I value including the identity of said SENDER node, the identity of said CHOOSER node, an INDEX value, and a predetermined initial HOPCOUNT value;
(c) means for selectively transmitting said forward restoration signature from said SENDER node based on said unique priority;
(d) means for modifying said forward restoration signature and selectively transmitting said modified forward restoration signature based on said unique priority upon receipt of said forward restoration signature at a first spare port on at least one TANDEM node, including
  (i) means for selectively assigning said forward restoration signature to a spare port based on said HOPCOUNT value of said forward restoration signal when said at least one TANDEM node has said spare port currently assigned a restoration signature having the same S/C/I value as said forward restoration signature,
  (ii) means for modifying said forward restoration signature by incrementing said HOPCOUNT value of said forward restoration signature and attempting to assign said modified forward restoration signature to each spare port when said TANDEM node has no spare port currently assigned a restoration signature having the same S/C/I value as said forward restoration signature, including
    (1) means for moving said further restoration signature to a queue associated with each spare port currently assigned a further restoration signature having a priority lower than said unique priority and assigning said modified forward restoration signature to said each spare port, (2) means for moving said modified forward restoration signature to a queue associated with each spare port currently assigned a further restoration signature having a priority higher than said unique priority, and (3) means for assigning said modified forward restoration signature to each spare port not currently assigned a restoration signature, and (iii) transmitting said restoration signatures assigned to said spare ports;

(e) means for selectively connecting said second working port to a second spare port on said CHOOSER node and transmitting a reverse restoration signature having said unique priority on said second spare port based on said unique priority upon receipt of said modified forward restoration signature on said second spare port;

(f) means for selectively connecting a third spare port on said at least one TANDEM node to said first spare port, modifying said reverse restoration signature, and transmitting said modified reverse restoration signature on said first spare port based on said unique priority upon receipt of said reverse restoration signature at said third spare port; and (g) means for connecting said first working port to a fourth spare port on said SENDER node on receipt of said modified reverse restoration signature at said fourth spare port, to thereby restore communications between said pair of nodes.

12. The system of claim 11, wherein said means for designating comprises:

(1) means for discarding said forward restoration signature when said at least one TANDEM node has a spare port currently assigned a restoration signature having the same S/C/I value as said forward restoration signature, and the same HOPCOUNT value as said forward restoration signature, (2) means for discarding said forward restoration signature when said at least one TANDEM node has a spare port currently assigned a restoration signature having the same S/C/I value as said forward restoration signature, and a lower HOPCOUNT value than said forward restoration signature, and (3) means for assigning said forward restoration signature to said spare port when said at least one TANDEM node has a spare port currently assigned a restoration signature having the same S/C/I value as said forward restoration signature, and a higher HOPCOUNT value than said forward restoration signature.

13. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) means for creating a forward restoration signature having a unique priority and an S/C/I value including the identity of said SENDER node, the identity of said CHOOSER node, an INDEX value, and a predetermined initial HOPCOUNT value;

(c) means for selectively transmitting said forward restoration signature from said SENDER node based on said unique priority;

(d) means for modifying said forward restoration signature and selectively transmitting said modified forward restoration signature based on said unique priority upon receipt of said forward restoration signature at a first spare port on at least one TANDEM node;

(e) means for selectively generating and transmitting a reverse restoration signature based on said unique priority upon receipt of said modified forward restoration signature on a second spare port on said CHOOSER node, including (i) means for generating a reverse restoration signature having said unique priority and an S/C/I value including the identity of said SENDER node, the identity of said CHOOSER node, an INDEX value, and a predetermined initial HOPCOUNT value, (ii) means for discarding said reverse restoration signature when a further reverse restoration signature having a priority higher than said unique priority is assigned to said second spare port, (iii) means for moving said reverse restoration signature into a queue associated with said second spare port when a forward restoration signature having a priority higher than said unique priority is assigned to said second spare port, (iv) means for assigning said reverse restoration signature to said second spare port and connecting said second working port to said second spare port when no further reverse restoration signature having a priority higher than said unique priority is assigned to said second spare port, and no forward restoration signature having a priority higher than said unique priority is assigned to said second spare port, and (v) means for transmitting said reverse restoration signature assigned to said second spare port;

(f) means for selectively connecting a third spare port on said at least one TANDEM node to said first spare port, modifying said reverse restoration signature, and transmitting said modified reverse restoration signature on said first spare port based on said unique priority upon receipt of said reverse restoration signature at said third spare port; and (g) means for connecting said first working port to a fourth spare port on said SENDER node on receipt of said modified reverse restoration signature at said fourth spare port, to thereby restore communications between said pair of nodes.

14. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) means for creating a forward restoration signature having a unique priority and an S/C/I value including the identity of said SENDER node, the identity of said CHOOSER node, an INDEX value, and a predetermined initial HOPCOUNT value;

(c) means for selectively transmitting said forward restoration signature from said SENDER node based on said unique priority;

(d) means for modifying said forward restoration signature and selectively transmitting said modified forward restoration signature based on said unique priority upon receipt of said forward restoration signature at a first spare port on at least one TANDEM node;

(e) means for selectively connecting said second working port to a second spare port on said CHOOSER node and transmitting a reverse restoration signature having said unique priority on said second spare port based on said unique priority upon receipt of said modified forward restoration signature on said second spare port;

(f) means for selectively modifying said reverse restoration signature and transmitting said modified reverse restoration signature based on said unique priority upon receipt of said reverse restoration signature at a third spare port on said at least one TANDEM node, including (i) means for rendering all queued restoration signatures having the same S/C/I value as said reverse restoration signature ineligible for transmission, (ii) means for sending release signals on all spare ports having no eligible forward restoration signatures, (iii) means for moving said reverse restoration signature into a queue associated with said first spare port when said first spare port is currently assigned a forward restoration signature having a priority higher than said unique priority, and (iv) means for connecting said third spare port to said first spare port, modifying said reverse restoration signature by incrementing the HOPCOUNT value of said reverse restoration signature, and transmitting said modified reverse restoration signature on said first spare port when said first spare port is currently assigned a forward restoration signature having a priority lower than said unique priority, and (g) means for connecting said first working port to a fourth spare port on said SENDER node on receipt of said modified reverse restoration signature at said fourth spare port, to thereby restore communications between said pair of nodes.

15. The system of claim 14, wherein said means for moving comprises:

(1) means for rendering all queued forward restoration signatures having the same S/C/I value as said reverse restoration signature eligible for transmission when said first spare port is currently assigned a forward restoration signature having a priority higher than said unique priority, (2) means for moving said restoration signature to each queue associated with a spare port and assigning said eligible forward restoration signature to said spare port when the restoration signature assigned to said spare port is of lower priority than an eligible forward restoration signature in said queue, and (3) means for transmitting said forward restoration signatures assigned to said spare ports.

16. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) means for creating a forward restoration signature having a unique priority and an S/C/I value including the identity of said SENDER node, the identity of said CHOOSER node, an INDEX value, and a predetermined initial HOPCOUNT value;

(c) means for selectively transmitting said forward restoration signature from said SENDER node based on said unique priority;

(d) means for modifying said forward restoration signature and selectively transmitting said modified forward restoration signature based on said unique priority upon receipt of said forward restoration signature at a first spare port on at least one TANDEM node;

(e) means for selectively connecting said second working port to a second spare port on said CHOOSER node and transmitting a reverse restoration signature having said unique priority on said second spare port based on said unique priority upon receipt of said modified forward restoration signature on said second spare port;

(f) means for selectively connecting a third spare port on said at least one TANDEM node to said first spare port, modifying said reverse restoration signature, and transmitting said modified reverse restoration signature on said first spare port based on said unique priority upon receipt of said reverse restoration signature at said third spare port; and (g) means for sending a connect signal from said SENDER node to said CHOOSER node along the path described by said modified reverse restoration signature on receipt of said modified reverse restoration signature at a spare port on said SENDER node;

(h) means for sending a connect acknowledge signal from said CHOOSER node along said path to said SENDER node on receipt of said connect signal by said CHOOSER node; and (i) means for connecting said fourth spare port to said first working port on receipt of said connect acknowledge signal at said spare port on said SENDER node, to thereby restore communications between said pair of nodes.

17. A system for restoring interrupted communications between a pair of nodes in a network having a plurality of nodes interconnected by spans, wherein each span comprises at least one link, wherein each link connects two nodes at node ports, the ports being either working ports or spare ports, the system comprising:

(a) means for designating one of the pair of nodes as a SENDER node, and the other of the pair of nodes as a CHOOSER node, wherein said SENDER node has a first working port connected to a first link bearing the interrupted communications and said CHOOSER node has a second working port connected to a second link bearing the interrupted communications;

(b) means for creating a forward restoration signature having a unique priority and an S/C/I value including the identity of said SENDER node, the identity of said CHOOSER node, an INDEX value, and a predetermined initial HOPCOUNT value;

(c) means for selectively transmitting said forward restoration signature from said SENDER node based on said unique priority;

(d) means for modifying said forward restoration signature and selectively transmitting said modified forward restoration signature based on said unique priority upon receipt of said forward restoration signature at a first spare port on at least one TANDEM node;

(e) means for selectively generating and transmitting a reverse restoration signature based on said unique priority upon receipt of said modified forward restoration signature on a second spare port on said CHOOSER node, including
  (i) means for connecting said second working port to said second spare port,
  (ii) means for accumulating received modified forward restoration signatures for a predetermined period of time,
  (iii) means for grouping said modified forward restoration signatures by S/C/I value to form groups;
  (iv) means for selecting the modified forward restoration signature having the lowest HOPCOUNT value for each of said groups,
  (v) means for generating a reverse restoration signature having said unique priority and an S/C/I value including the identity of said SENDER node, the identity of said CHOOSER node, an INDEX value, and a predetermined initial HOPCOUNT value, and
  (vi) means for selectively transmitting said reverse restoration signature on said second spare port based on said unique priority;

(f) means for selectively connecting a third spare port on said at least one TANDEM node to said first spare port, modifying said reverse restoration signature, and transmitting said modified reverse restoration signature on said first spare port based on said unique priority upon receipt of said reverse restoration signature at said third spare port; and (g) means for connecting said first working port to a fourth spare port on said SENDER node on receipt of said modified reverse restoration signature at said fourth spare port, to thereby restore communications between said pair of nodes.

18. The system of claim 17, wherein said means for selectively transmitting said reverse restoration signature comprises:

(1) means for discarding said reverse restoration signature when a further reverse restoration signature having a priority higher than said unique priority is assigned to said second spare port, (2) means for moving said reverse restoration signature into a queue associated with said second spare port when a forward restoration signature having a priority higher than said unique priority is assigned to said second spare port, (3) means for assigning said reverse restoration signature to said second spare port when no reverse restoration signature having a priority higher than said unique priority is assigned to said second spare port, and no forward restoration signature having a priority higher than said unique priority is assigned to said second spare port, and (4) means for transmitting said reverse restoration signature assigned to said second spare port.

* * * * *